(12) United States Patent
Zhang

(10) Patent No.: US 11,644,412 B2
(45) Date of Patent: May 9, 2023

(54) THIN FILM SPECTROELLIPSOMETRIC IMAGING

(71) Applicant: Aizhong Zhang, Rochester, NY (US)

(72) Inventor: Aizhong Zhang, Rochester, NY (US)

( * ) Notice: Subject to any disclaimer, the term of this patent is extended or adjusted under 35 U.S.C. 154(b) by 0 days.

(21) Appl. No.: 16/945,872

(22) Filed: Aug. 2, 2020

(65) Prior Publication Data

US 2022/0034791 A1 Feb. 3, 2022

(51) Int. Cl.
*G01N 21/21* (2006.01)
*G01B 11/06* (2006.01)
*G01N 21/17* (2006.01)

(52) U.S. Cl.
CPC ............ *G01N 21/211* (2013.01); *G01B 11/06* (2013.01); *G01N 2021/1765* (2013.01); *G01N 2021/213* (2013.01)

(58) Field of Classification Search
CPC ......... G01N 21/211; G01N 2021/1765; G01N 2021/213; G01B 11/06
USPC ......................................................... 356/364
See application file for complete search history.

(56) References Cited

U.S. PATENT DOCUMENTS

| | | | |
|---|---|---|---|
| 3,985,447 A | 10/1976 | Aspnes | |
| 4,647,207 A | 3/1987 | Bjork et al. | |
| 4,653,924 A | 3/1987 | Itonaga et al. | |
| 4,957,368 A | 9/1990 | Smith | |
| 5,061,072 A | 10/1991 | Folkhard et al. | |
| 5,076,696 A * | 12/1991 | Cohn | G01N 21/211 356/369 |
| 5,166,752 A | 11/1992 | Spanier et al. | |
| 5,625,455 A * | 4/1997 | Nash | G01N 21/211 356/369 |
| 5,835,220 A * | 11/1998 | Kazama | G01J 4/04 356/369 |
| 5,856,871 A * | 1/1999 | Cabib | G06K 9/76 356/503 |

(Continued)

OTHER PUBLICATIONS

Zhang, Salahura, Kottaiyan, Yoon, Aquavella, Zavislan "Multimodal imaging of ocular surface of dry eye subjects" Multi Biomed Imag XI, vol. 9701, p. 97010H Int Sec Opt&Photon 2016.

(Continued)

*Primary Examiner* — Tarifur R Chowdhury
*Assistant Examiner* — Omar H Nixon
(74) *Attorney, Agent, or Firm* — Lynne M. Blank, Esq.

(57) ABSTRACT

A method and device of thin film spectroellipsometric imaging are disclosed. The device comprises an illuminator to direct light through a polarization generator system toward an extended area of a sample; an imaging system to form images; a detection system to record in a plurality of spectral channels; a computer to display and analyze the recorded images; and at least one reference phantom with known optical properties to replace the sample for calibration. The method comprises directing light from an illuminator through a polarization generator system toward an extended area of a sample having a geometrical shape; forming images with an imaging system; adjusting a polarization generator system and a polarization analyzer system to obtain a series of polarimetric setups; recording the images with a detection system in a plurality of spectral channels; replacing the sample with at least one reference phantom; and analyzing the recorded images with a computer.

20 Claims, 13 Drawing Sheets

(56) References Cited

U.S. PATENT DOCUMENTS

| | | | | |
|---|---|---|---|---|
| 6,275,291 B1* | 8/2001 | Abraham | ............ | G02B 5/1809 |
| | | | | 356/369 |
| 6,278,519 B1 | 8/2001 | Rosencwaig et al. | | |
| 6,636,309 B1 | 10/2003 | Johs et al. | | |
| 6,940,595 B1 | 9/2005 | Johs et al. | | |
| 7,075,650 B1* | 7/2006 | Johs | ............ | G01N 21/274 |
| | | | | 356/369 |
| 7,106,425 B1* | 9/2006 | Bultman | ............ | G01N 21/211 |
| | | | | 356/237.2 |
| 7,151,605 B1* | 12/2006 | Herzinger | ............ | G01J 3/28 |
| | | | | 356/369 |
| 7,295,313 B1 | 11/2007 | Johs et al. | | |
| 7,369,235 B1* | 5/2008 | Janik | ............ | G01B 11/0641 |
| | | | | 356/369 |
| 7,616,319 B1 | 11/2009 | Woollam et al. | | |
| 7,889,340 B1* | 2/2011 | Flock | ............ | G01N 21/211 |
| | | | | 356/369 |
| 8,810,772 B2* | 8/2014 | Maeda | ............ | G03F 7/20 |
| | | | | 355/52 |
| 9,612,212 B1* | 4/2017 | Leem | ............ | G01N 21/8806 |
| 10,132,686 B1* | 11/2018 | Kim | ............ | G01J 3/4531 |
| 10,627,288 B1* | 4/2020 | Liphardt | ............ | G01J 3/0213 |
| 10,709,327 B2 | 7/2020 | Zhang | | |
| 2005/0001172 A1* | 1/2005 | Harrison | ............ | G01J 3/2803 |
| | | | | 250/372 |
| 2006/0114470 A1* | 6/2006 | Takashima | ............ | G01B 11/0625 |
| | | | | 356/453 |
| 2007/0146706 A1* | 6/2007 | Garcia-Caurel | ............ | G01N 21/211 |
| | | | | 356/369 |
| 2007/0229852 A1* | 10/2007 | Wack | ............ | G01N 21/211 |
| | | | | 356/625 |
| 2013/0016346 A1* | 1/2013 | Romanovsky | ............ | G01N 21/9501 |
| | | | | 356/237.5 |
| 2013/0044318 A1* | 2/2013 | Cho | ............ | G01N 21/211 |
| | | | | 356/369 |
| 2018/0073979 A1* | 3/2018 | Cho | ............ | H04N 5/247 |
| 2019/0170655 A1* | 6/2019 | Smith | ............ | G01N 21/21 |
| 2019/0183332 A1* | 6/2019 | Zhang | ............ | G01N 21/211 |
| 2019/0286787 A1* | 9/2019 | Chouaib | ............ | G06F 30/17 |
| 2020/0200525 A1* | 6/2020 | Chouaib | ............ | G03F 7/70616 |
| 2020/0243400 A1* | 7/2020 | Wang | ............ | G03F 7/70633 |
| 2021/0055699 A1* | 2/2021 | Agarwal | ............ | G05B 13/042 |
| 2021/0068655 A1* | 3/2021 | Zhang | ............ | A61B 3/103 |
| 2021/0262921 A1* | 8/2021 | Boosalis | ............ | G01N 21/211 |

OTHER PUBLICATIONS

Lee, Kan Yan, and Yu Faye Chao. "The ellipsometric measurements of a curved surface." Japanese journal of applied physics 44, No. 7L (2005): L1015.

Han, Lee, and Chao "Determining thickness of films on a curved substrate by use of ellipsometric measurements." Appl Optics 48, No. 17 (2009): 3139-3143.

Li, Jiang, Zhang, Chen, Gu, Liu "Characterization of curved surface layer by Mueller matrix ellipsometry" JrnlofVacSci&TechB, Nanotech &Micro:Mtls,Proc,Msmnt,Phenmn 34,2 020602.

Hagen, Gao, Tkaczyk, Kester "Snapshot advantage: a review of the light collection improvement for parallel high-dimensional measurement systems" Opt Eng 51, No. 11 (2012) 111702.

Oka, Haga, Michida "Snapshot Mueller—matrix spectropolarimeter using spectral and spatial carriers" PolarznSci&RemoteSens VII, vol. 9613, p. 96130E, ISOP (2015).

Chipman, Russell A. "Polarimetry." Handbook of Optics 2 (1994): 22.

Lu, Shih-Yau, and Russell A. Chipman. "Interpretation of Mueller matrices based on polar decomposition." JOSA A 13, No. 5 (1996): 1106-1113.

* cited by examiner

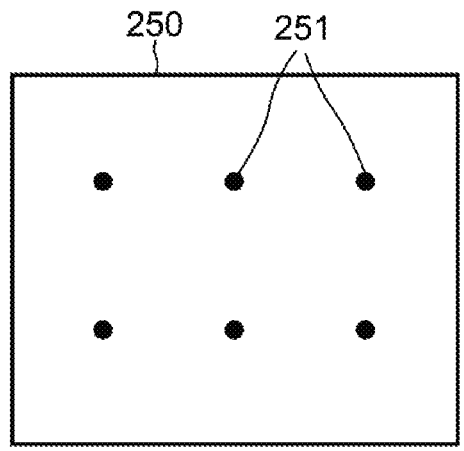
FIG. 2(a)
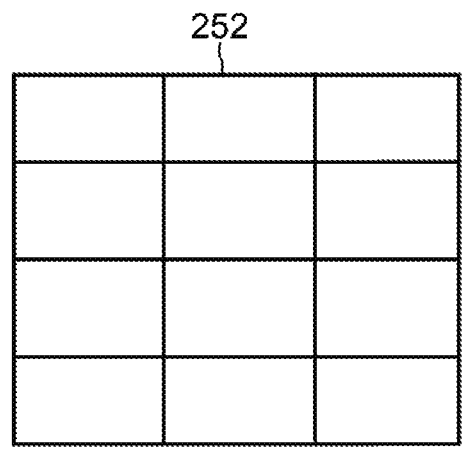
FIG. 2(b)
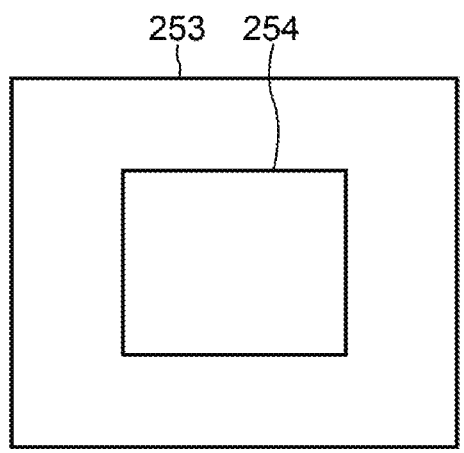
FIG. 2(c)
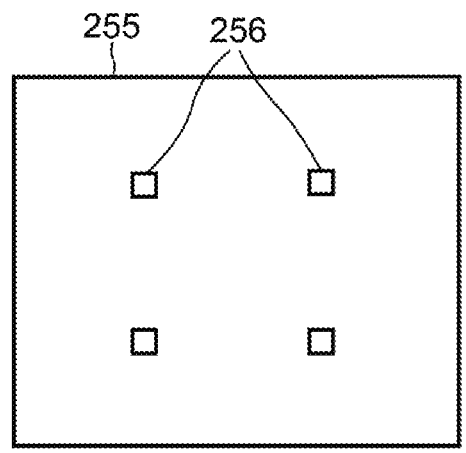
FIG. 2(d)
FIG. 2

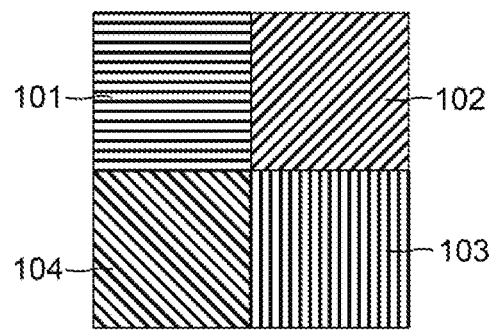
FIG. 7(a)
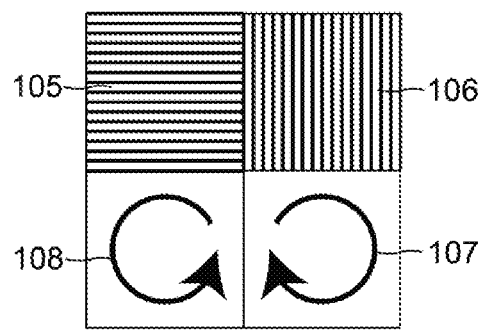
FIG. 7(b)
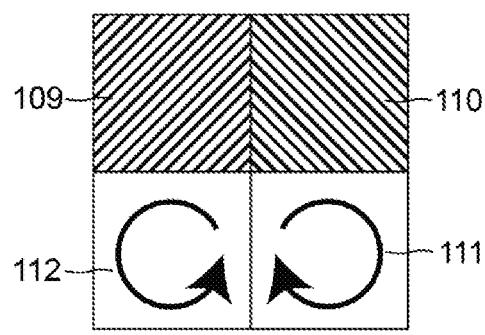
FIG. 7(c)
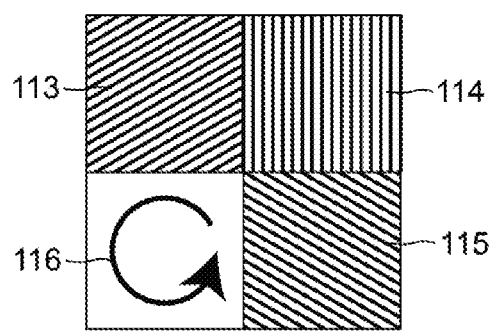
FIG. 7(d)
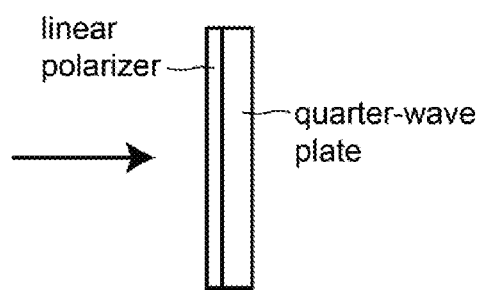
FIG. 7(e)
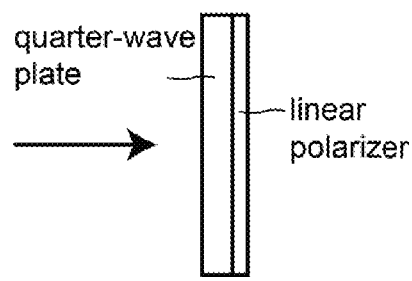
FIG. 7(f)
FIG. 7

THIN FILM SPECTROELLIPSOMETRIC IMAGING

FIELD OF THE INVENTION

This invention relates to the field of thin film metrology, in particular, to spectroellipsometric imaging devices and methods of a thin film structure on a curved surface.

BACKGROUND OF THE INVENTION

A thin film is one or more layers of coating materials deposited on a substrate, commonly used to change the optical or mechanical properties of the bare substrate. A number of thin film metrology techniques are known in the art to provide non-invasive means to characterize various types of thin films. These techniques usually involve measurements of the irradiance and/or the polarization of the transmitted and reflected light from the sample under test. Common thin film measurement techniques include but are not limited to monochromatic reflectometry, spectral reflectometry, and ellipsometry. In the methods of reflectometry, usually irradiance reflectance values are measured, while in the methods of ellipsometry, the polarization states are evaluated.

Ellipsometry is generally considered as a branch of polarimetry that measures the complex refractive index and thickness of thin films. In ellipsometry, the polarization states of the light before and after reflection or transmission of a sample are measured. The incident light can be monochromatic or broadband. Usually, polarizers, quarter-wave plates, or some other compensators are employed in the optical path. The incident angle and the wavelength spectrum of the light are properly chosen, and the orientation directions of the polarization elements are precisely controlled or rotated, so that the change in the polarization state of the beam could be measured. The change in polarization is characterized in both amplitude and phase changes, and they are very sensitive to the thickness and refractive index values of the thin films. In the prior art of ellipsometers, two types are commonly seen, the rotating null ellipsometer and the rotating analyzer ellipsometer. Some types of ellipsometry methods or apparatuses are described in U.S. Pat. Nos. 3,985,447, 4,647,207, 4,653,924, 4,957,368, 5,061,072, and 5,166,752, all incorporated herein by reference in their entirety.

Conventionally, ellipsometry was limited to measure flat surfaces, and in recent years, several methods have been developed to apply ellipsometry on curved surfaces. Chao et al described a method of determining thickness of films on a curved substrate by a three-intensity measurement technique in "*The ellipsometric measurements of a curved surface.*" Japanese Journal of Applied Physics 44, no. 7L (2005), and "*Determining thickness of films on a curved substrate by use of ellipsometric measurements.*" Applied Optics 48, no. 17 (2009), incorporated herein by reference in their entirety. Furthermore, Li et al characterized a curved surface layer by Mueller matrix ellipsometry in "*Characterization of curved surface layer by Mueller matrix ellipsometry.*" Journal of Vacuum Science & Technology B, Nanotechnology and Microelectronics: Materials, Processing, Measurement, and Phenomena 34, no. 2 (2016), incorporated herein by reference in its entirety. However, in the aforementioned prior art, these ellipsometric thin film measurement techniques are either limited to a flat sample, such as thin film coatings on a silicon wafer, or an approximately flat portion of a thin film coating on a curved substrate sample. For a curved surface, these techniques are either not applicable or only applicable to a very limited illuminated area of the measurement, where the region under investigation could be analyzed as a flat region. In some systems, an auxiliary focusing lens group is utilized to limit the illumination spot size to ensure the validity of the planar surface approximation of a small region on a curved surface.

Also, the prior art systems are limited to static coating, due to strict mounting constraints. Therefore, dynamic and fluidic coatings, such as the dynamically evolving lipid layer of a human tear film, anterior to a human eye, are generally not measurable with these techniques.

Further, to ensure a precise measurement with methods in the prior art, strict alignment requirements must be met. For example, the sample position has to be fixated and flat, the angles of incidence and reflection are precisely controlled, and the polarization elements precisely rotate at certain steps and to a certain position. Without a tight tolerance for alignment of these measurement systems in the prior art, the calculated thickness or refractive index values are not accurate, or even meaningless.

In some prior art systems, reference samples with known thin film coating thicknesses have been used for system calibration. For example, in U.S. Pat. No. 6,278,519, incorporated herein by reference in its entirety, a silicon substrate with an oxide layer of about 20 angstroms thickness is used for system calibration. However, these reference samples are also limited to planar or approximately planar samples.

Spectroellipsometry combines spectroscopy with ellipsometry. In general, spectral information reveals the molecular and chemical composition of a sample, and the polarimetric or ellipsometric information reveals the shape, texture, thin film coating structure and surface roughness, etc. Conventional spectroellipsometry has been described in U.S. Pat. Nos. 6,636,309, 6,940,595, 7,295,313, and 7,616,319, all incorporated herein by reference in their entirety. However, these spectroellipsometric devices and methods only measure flat samples and usually only measure a small spot of the sample.

This invention integrates ellipsometry with spectroscopic imaging. Multispectral imaging is an imaging method that capture image data of an object in several spectral bands. The spectral bands may be obtained by spectral filters and different detectors that are sensitive to particular wavelength ranges. The number of multispectral imaging spectral bands is usually fewer than 20.

Hyperspectral imaging is an imaging method that combines imaging with spectroscopy, where there are many more spectral channels than multispectral imaging and usually hundreds of, or even more, spectral channels are used. Hyperspectral channels are usually contiguous, and the spectral resolution is usually much higher than multispectral imaging. Because of the extra spectral dimension, the resultant images are "hypercubes" with (x, y, λ) three dimensions, where (x, y) are the two spatial dimensions, and λ represents the spectral dimension.

Over the past decades, a series of snapshot imaging spectrometers with higher optical throughput have been developed, which could record the 3D hypercube or even higher dimensional dataset in a single snapshot. Various designs of these snapshot imaging spectrometers, including computed tomographic imaging spectrometry (CTIS), coded aperture snapshot spectral imaging (CASSI), image mapping spectrometry (IMS), etc. have been described by Hagen, et al. in "*Snapshot advantage: a review of the light collection improvement for parallel high-dimensional measurement systems.*" Optical Engineering 51, no. 11 (2012).

Further, U.S. Pat. No. 10,709,327 describes a device and method to apply ellipsometric imaging to thin films on a curved surface, however, spectroscopic technique is not used and there is limited polarization control in that patent.

SUMMARY OF THE INVENTION

It is an object of this invention to combine three optical techniques together: spectroscopy, ellipsometry, and imaging.

It is another object of this invention to integrate multispectral and hyperspectral imaging with ellipsometry for thin film metrology.

It is another object of this invention to expand the scope of imaging ellipsometry to a curved surface.

It is another object of this invention to relax the system alignment requirements, so that large displacement of the sample position could be tolerated, yet nanometer-scale thickness accuracy could still be achieved.

It is another object of this invention to use at least one reference phantom with known optical properties to calibrate the system.

It is yet another object of this invention to evaluate not only static but dynamic thin films, such as the tear film of an eye, with a spectroellipsometric imaging device.

It is still another object of this invention to provide a plurality of methods to analyze the thin film structure of a sample with the help of at least one reference phantom.

The present invention relates to a thin film spectroellipsometric imaging device, comprising an illuminator to direct light through a polarization generator system toward an extended area of a sample, wherein the sample has a geometrical shape; an imaging system to form images of the extended area of the sample, wherein the imaging system comprises a polarization analyzer system; a detection system to record the images, wherein the detection system comprises a plurality of spectral channels; a computer to display and analyze the recorded images from the detection system; and at least one reference phantom with known optical properties to replace the sample for calibration, wherein the at least one reference phantom has the same or substantially similar geometrical shape as of the sample or a segment of the sample. Also, the polarization analyzer system could be integrated in the detection system instead of the imaging system.

The invention also includes a method performed by a thin film spectroellipsometric imaging device, comprising directing light from an illuminator through a polarization generator system toward an extended area of a sample having a geometrical shape, wherein the illuminator is broadband, covering visible and infrared spectra; forming images of the extended area of the sample with an imaging system, wherein the images are formed on a detection system, wherein the imaging system or the detection system comprises a polarization analyzer system; adjusting the polarization generator system and the polarization analyzer system to obtain a series of polarimetric setups; recording the images of the sample in the series of polarimetric setups with the detection system, wherein the detection system measures in a plurality of spectral channels; replacing the sample with at least one reference phantom with known optical properties to record images of the at least one reference phantom, wherein the at least one reference phantom has the same or substantially similar geometrical shape as of the sample or a segment of the sample; and analyzing the recorded images of the sample and the at least one reference phantom with a computer. The images are recorded, preferably, as digital numbers. Further, the method comprises transforming the images of the at least one reference phantom to match the images of the sample, based on images of a registration pattern panel. The analyzing comprises compensating the digital numbers with flat-field correction; taking ratios of the digital numbers or mutual subtraction of the digital numbers from the sample and at least one reference phantom under the same polarimetric setups; forming an equation set of unknown optical parameters in the series of polarimetric setups; determining the unknown optical parameters by solving the equation set. Alternatively, the analyzing comprises selecting a search range for unknown optical parameters of the sample; creating a lookup table of ratios of digital numbers or mutual subtraction of digital numbers of the sample and the at least one reference phantom for all possible combinations of the unknown optical parameters in the search range; comparing experimentally measured ratios of the digital numbers or mutual subtraction of the digital numbers of the sample and the at least one reference phantom with the lookup table, and selecting a set of optical parameters that generates the least discrepancy in the ratios of the digital numbers or mutual subtraction of the digital numbers to determine the unknown optical parameters.

BRIEF DESCRIPTION OF THE DRAWINGS

FIG. 2 presents four possible embodiments of the optional registration pattern panel. FIG. 2(a) presents a registration pattern panel with a series of separate dots. FIG. 2(b) presents a registration pattern panel with a wire grid pattern. FIG. 2(c) presents a registration pattern panel with a box pattern. FIG. 2(d) presents one embodiment, where the registration pattern is not an independent panel, but integrated with a polarization generator system, and the polarization output from some subareas are different from that of the rest of the output area.

FIG. 7 presents different embodiments of the 2×2 analyzer array. FIG. 7(a) comprises four different linear analyzers: 0°, 45°, 90° and 135° linear analyzers. FIG. 7(b) comprises two linear analyzers (0° and 90°), and two circular analyzers (a right-hand circular analyzer and a left-hand circular analyzer). FIG. 7(c) comprises two linear analyzers (45° and 135°), and two circular analyzers (a right-hand circular analyzer and a left-hand circular analyzer). FIG. 7(d) comprises three linear analyzers (30°, 90°, and 150°), and one circular analyzer. FIG. 7(e) presents a circular polarizer, used here as a linear analyzer, with the linear polarizer facing toward the incident light. FIG. 7(f) presents a circular analyzer, with the quarter-wave plate facing toward the incident light.

DETAILED DESCRIPTION OF THE INVENTION

Figure 1:
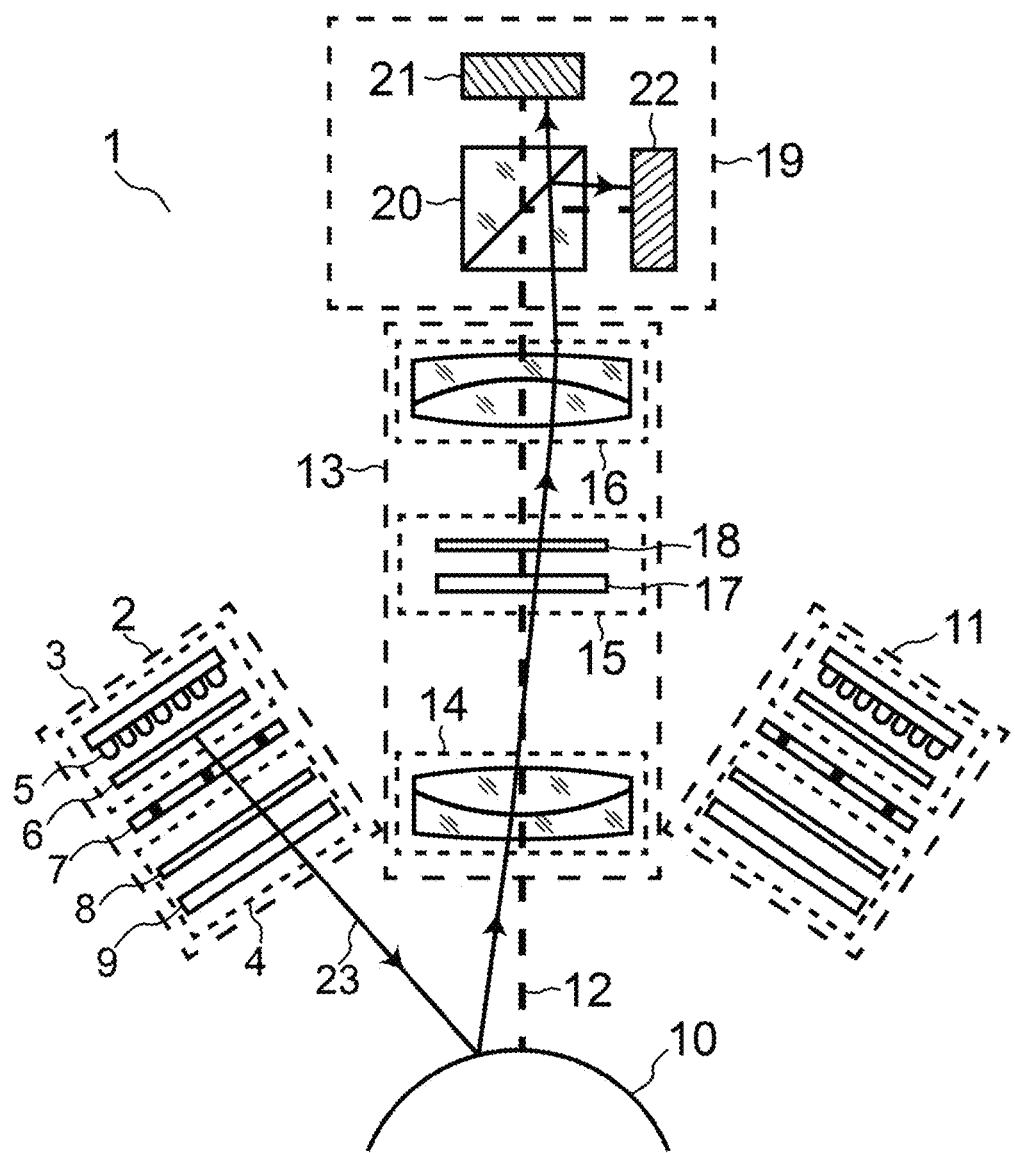
FIG. 1 presents Embodiment 1 of the device for thin film spectroellipsometric imaging.

FIG. 1 presents one embodiment, Embodiment 1, of the disclosed device for thin film spectroellipsometric imaging. The entire device 1 comprises an illuminator 2, an imaging system 13 and a detection system 19. An illuminator 2 directs light from a light source 3 through an optional registration pattern panel 7 and a polarization generator system 4. Preferably, the light source 3 is a broadband light source, covering both visible and near infrared. Larger wavelength ranges including ultraviolet (UV), short wave infrared (SWIR), mid-wave infrared (MWIR) and long wave infrared (LWIR) are also possible for the light source 3. In one preferred embodiment, the light source 3 comprises an array of light-emitting diodes (LEDs) 5, and a translucent optical diffusing structure 6 to distribute the output light more uniformly. The embodiment of the light source could also comprise other light sources, such as tungsten-halogen lamps, mercury lamps, xenon lamps, metal halide lamps, liquid-crystal displays (LCDs), organic light-emitting diodes (OLEDs), superluminescent diodes (SLDs), supercontinuum lasers, and a combination of multiple lasers (preferably aligned coaxially with beamsplitters), etc. In some embodiments of the light source, a spherical or conical reflecting mirror is integrated in the lamphouse to improve the directionality of the light source. In one embodiment, the diffusing structure 6 comprises one layer or many spaced layers of translucent materials. Alternatively, the diffusing structure could comprise one layer or many spaced layers of holographic diffusers. Further, in one embodiment, the illuminator comprises two symmetrical groups 2 and 11 to illuminate the sample from two directions, with 11 being symmetric to 2 with respect to the optical axis 12, as shown in FIG. 1. Note that the addition of the symmetric group 11 as part of the illuminator is optional. In some other embodiments, the illuminator has the overall shape of a conical frustum, with four or even more individual illumination subgroups.

Further, in one embodiment, the illuminator 2 could rotate with respect to the optical axis 12 of the system, to adjust the azimuthal angle of illumination. In another embodiment, the illuminator symmetric groups 2 and 11 could be rotated together with respect to the system optical axis 12. This rotation of the illuminator could apply to all the other embodiments hereinafter.

In one preferred embodiment of the illuminator 2, the polar angle of the illuminator with respect to the system optical axis 12 could also be adjusted with a rotatable arm. Hence, it's possible to achieve a large range of incident angles for the same point on the sample, including relatively large incident angles close to the Brewster angle of the sample.

The optional registration pattern panel 7 is used to minimize the effects of the difference in the position and the geometric shape of a sample and a reference phantom. In the disclosed methods, a reference phantom with the same or substantially similar geometrical shape of the sample is used to calibrate the system, which will be described later in detail. In FIG. 1 the registration pattern panel 7 is placed between the light source 3 and the polarization generator system 4. However, it could also be placed between the polarization generator system and the sample. If the registration pattern panel is placed after the polarization generator system, preferably it is non-polarizing. For example, it could be a non-polarizing thin glass plate with non-transparent patterns coated on it, or a thin wire pattern attached to the polarization generator system. Further, in some embodiments, the registration pattern is not an independent panel, but rather, it's integrated with the polarization generator system, such that some subareas of the polarization generator system have different polarization output, hence the final recorded irradiance pattern on the detector will contain registration information as well as the overall sample thin film optical properties information.

Note that the size of the registration pattern has to be appropriately chosen such that the recorded image of the registration pattern is large enough for image registration, yet small enough so that the valid region of interest for spectroellipsometric imaging analysis is not compromised by too much. Further, since the detection system is focused on the sample surface, the image of the registration pattern is often defocused. Therefore, a centroid-finding algorithm or some edge or line detection algorithms are usually employed in image registration. Moreover, the image registration is of particular importance for dynamic samples, such as in the human tear film measurement. Due to the involuntary movement of the eye and the head, the recorded image series tend to contain slight movements (image jittering) of the eye. The registration process with the registration pattern images of the sample and the reference phantom could significantly minimize the effect of displacements caused by this type of sample movements. Hence, it could significantly relax the system alignment requirements to millimeter-scale or even larger tolerance values, yet nanometer-scale thickness accuracy could still be achieved.

FIG. 2 presents four possible embodiments of the optional registration pattern panel. FIG. 2(a) presents one embodiment of a registration pattern panel 250 with a series of separate dots 251. The panel 250 could be a non-polarizing glass plate, and the dots pattern 251 could be opaque prints on the panel 250. The image of the centroids of the recorded dots pattern could be used for registration. FIG. 2(b) presents one embodiment of a registration pattern panel 252, which has a wire grid pattern. The wire grid could be made of darkened metal wires. The image of the lines and intersections of the grid pattern could be used for registration. FIG. 2(c) presents one embodiment of a registration pattern panel 253, which has a box pattern 254. The image of the sides and corners of the grid pattern could be used for registration. FIG. 2(d) presents one embodiment, where the registration pattern is not an independent panel, but integrated with the polarization generator system. The polarization generator system output area 255 include several subareas 256 where the polarization output from these subareas are different from that of the rest of the output area. This could be achieved for example, if pixelated liquid crystal variable retarders are used in the polarization generator system and electrical voltage variation are applied to the subareas to be used for image registration. Note that even though separate square-shaped subareas are used in FIG. 2(d), the subareas could be of other shapes.

One preferred embodiment of the polarization generator system 4 comprises a linear polarizer 8 and a rotating retarder 9, as presented in FIG. 1. Preferably, the rotating retarder 8 is a rotating achromatic (broadband) quarter-wave plate. In some other embodiments, the polarization generator system could alternatively comprise a linear polarizer, a circular polarizer, an elliptical polarizer, or a rotating linear polarizer. It could also comprise a linear polarizer and two variable retarders, where the fast axes of the two variable retarders are orientated 45° to each other, and the variable retarders could be liquid crystal variable retarders (LCVR), or a pair of Babinet-Soleil compensators, or a pair of photo-elastic modulators (PEMs) or electro-optical modulators (such as Pockels cells), or magneto-optical modulators. The polarization generator system could also be a linear polarizer and a ferroelectric liquid crystal (FLC) retarder, which has a switchable axis orientation, or a combination of a linear polarizer, a rotating quarter-wave retarder and a rotating half-wave retarder. In some embodiments, the polarization generator system in both directions could be displaced out of the optical path.

After emitting from the light source 3 and passing through the optional registration pattern panel 7 and the polarization generator system 4, the polarized light exits the illuminator 2 and reaches an extended area of a sample 10 in FIG. 1. In some embodiments, the illuminator 2 could further comprise a beam shaping group (not shown in FIG. 1) to accommodate to the shape of the sample under measurement to enhance the system optical throughput. The beam shaping group could be placed between the light source and the polarization generator system, or it could be placed between the polarization generator system and the sample. The sample could be flat or curved, and it could also be of a freeform shape. In FIG. 1, a convex sample is illustrated. The sample could be static or the sample could have a thin film that dynamically evolves. Usually, the thin film is coated on the anterior surface of a sample. A special case of the sample is a human eye, where the dynamic change of the tear film anterior to the cornea could be measured by the disclosed spectroellipsometric imaging devices and methods. Preferably, fasteners or mechanical supports could be used to hold the sample stable. For human ocular surface measurements, a chin and head rest could be used to support and stabilize a subject. In some embodiments, especially for static samples mounted on a rotatable stage, the sample could be rotated with respect to the system optical axis 12. This rotation of the sample stage could apply to all the other embodiments hereinafter, if the sample could be conveniently rotated.

Preferably, a reference phantom of the same or similar geometrical shape could be used to replace the sample and calibrate the system. The reference phantom is made of known geometry and material; hence its optical properties are accurately known. For simplicity, usually a bare substrate reference phantom made of known glass, such as BK7 or SF14 could be used as the reference phantom, although thin film coated substrate with known thin film layer thicknesses and refractive indices could also be used. Preferably, both the thin film and substrate are of isotropic materials for the reference phantom, which tends to generate more robust results during calibration than reference phantoms with an anisotropic thin film coating or an anisotropic substrate. Further, if the refractive index of the sample is known in a predetermined range, it's preferred to choose a reference phantom with a close refractive index, so that the dynamic range requirement of the detector could be relaxed and the overall system calibration accuracy could be increased. If a freeform surface is under test, it could decompose into measurable flat or curved segments, and multiple reference phantoms could be used to calibrate different segments of the freeform surface, with each reference phantom having a geometrical shape similar to the segment to be calibrated.

Furthermore, in some embodiments, the illuminator could comprise a tunable narrow band filter or a dispersive optical element to adjust the illumination spectrum, and the illuminator may function as a monochromator. At any moment, the illumination spectrum is of limited wavelength range, but the illumination spectrum could step through a wide range of wavelengths to generate broadband illumination with time.

Reflected light is directed to go through an imaging system 13, as shown by one exemplary ray 23. In one preferred embodiment as shown in FIG. 1, the imaging system 13 comprises an objective group 14, a polarization analyzer system 15, and a focusing group 16. In FIG. 1, the objective group 14 and focusing group 16 are lens groups. However, in some other embodiments, the objective group and focusing group could be mirror groups, or catadioptric groups. More preferably, light is collimated after the objective group 14. Light continues to pass through the polarization analyzer system 15. One preferred embodiment of the polarization analyzer system 15 comprises a rotating retarder 17 and a linear analyzer 18. Similar to the polarization generator system but usually with optical elements positioned in reverse sequence, the polarization analyzer system could comprise, for example, a linear analyzer, a circular analyzer, an elliptical analyzer, a rotating linear analyzer, a combination of a rotating achromatic (broadband) quarter wave plate and a linear analyzer, or a combination of two variable retarders orientated at 45° to each other and a linear analyzer, or a combination of a rotating half-wave retarder, a rotating quarter-wave retarder, and a linear analyzer. The polarization analyzer system could also be a ferroelectric liquid crystal (FLC) retarder and a linear analyzer, where the FLC retarder has a switchable axis orientation. Other embodiments of the polarization analyzer system could also use photo-elastic modulators (PEMs) or electro-optical modulators, or magneto-optical modulators. In another embodiment of the polarization analyzer system, a combination of a waveplate and a polarizing beamsplitter could be used. A polarizing beamsplitter such as a Wollaston prism could be used, preferably along with a (rotating or stationary) waveplate, to split light of different polarizations onto different detectors or different regions of a single detector.

Further, in some embodiments, both the polarization generator system 4 and the polarization analyzer system 15 could be displaced out of the optical path, so that the images with and without polarization control could be compared and analyzed. Note the displacement of the polarization generator and analyzer systems could also apply to other embodiments hereinafter.

Note that the disclosed embodiments of the polarization generator system and the polarization analyzer system could also be applied to other embodiments described hereinafter.

After the imaging system 13, light reaches a detection system 19. FIG. 1 presents one preferred embodiment of the detection system 19, which includes a dichroic beamsplitter 20, a first detector 21 sensitive to the visible spectrum, and a second detector 22 sensitive to the infrared spectrum. In one embodiment, the visible detector 21 has red, green, and blue (RGB) three color channels, and the infrared detector 22 has one monochromatic infrared channel. Alternatively, the infrared detector 22 could have more spectral channels to further distinguish different infrared spectral bands. The detection system could also have more dichroic beamsplitters or other dispersive elements and matching detectors to operate in ultraviolet, visible, near-infrared, short-wave infrared, mid-wave infrared and long-wave infrared. In some other embodiments, the detection system could comprise at least one spectral splitting optical element, which could be at least one dichroic beamsplitter, at least one tunable filter, and at least one grating, etc. If a tunable filter is used, it could be a liquid crystal tunable filter, an acousto-optic tunable filter, or a rotating wheel with narrow band spectral filters.

Note that in preferred embodiments, stray light baffles or blockers (not shown in FIG. 1) are included in the system to minimize the background noise caused from unwanted stray light.

For large-sized samples or highly curved samples, an enlarged depth of field might be required. Preferably, the positions of the objective group 14 and the focusing group 16 could be adjusted to fine-tune the focal plane location. In a preferred embodiment, the imaging system 13, or the detection system 19, or the sample mechanical support could be adjusted axially so that a depth scan along the optical axis direction within a certain range is possible. An image fusion algorithm could be used to generate a fused image with optimal image quality by combining a series of multi-focus images.

Figure 3:
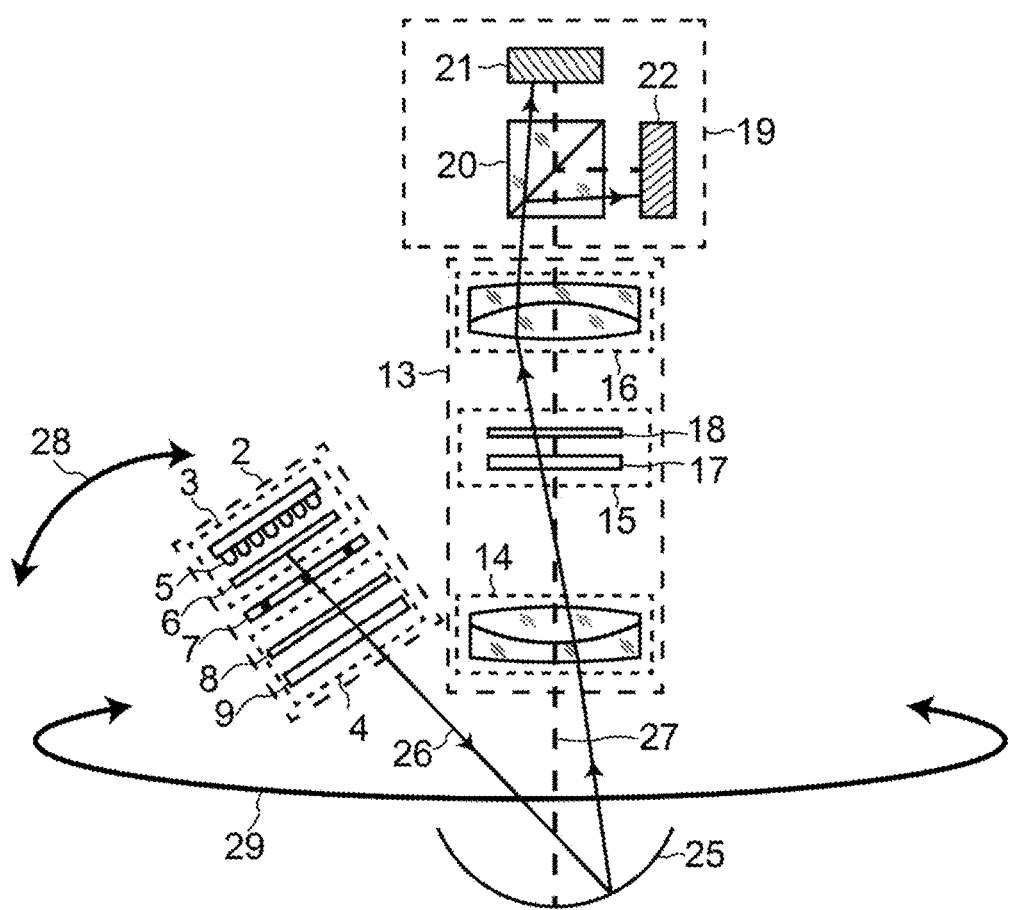
FIG. 3 presents Embodiment 2 of the device for thin film spectroellipsometric imaging with a concave surface under measurement.

FIG. 3 presents Embodiment 2 of the device for thin film spectroellipsometric imaging, where the geometric setup of a concave surface under measurement is shown. The overall setup is similar to that of FIG. 1, yet without the optional symmetric illuminator group 11. The position of an illuminator 2 could be rotated to adjust its azimuthal angle as shown by an arrowed line 29, and its polar angle with respect to the system axis 27 as shown by an arrowed line 28. After rotation, its pointing direction could be further adjusted. As illustrated by a ray 26, after the polarization generator system 4, light reaches an extended area of a sample 25 with a concave surface under test.

Figure 4:
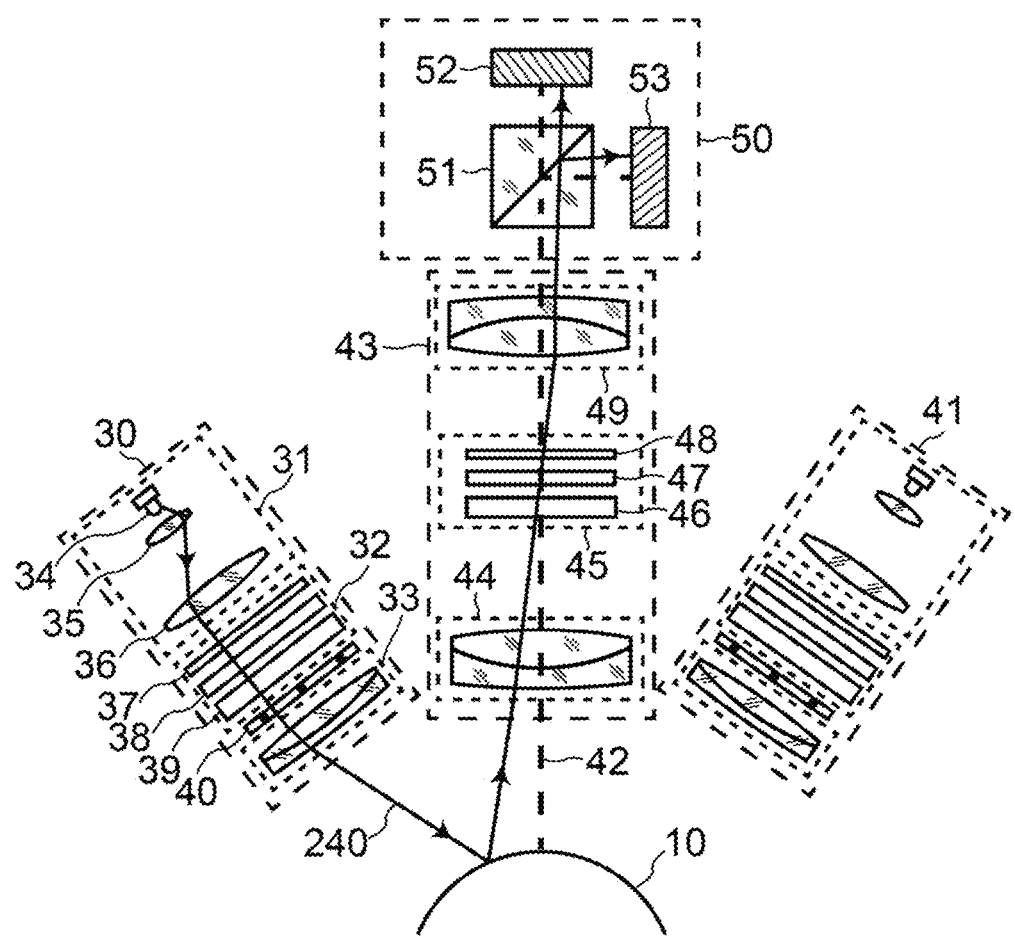
FIG. 4 illustrates Embodiment 3 of the device, where the illuminator and the imaging system are reconfigured.

FIG. 4 illustrates Embodiment 3 of the disclosed thin film spectroellipsometric imaging device, where the illuminator and the imaging system are reconfigured. The illuminator 30 directs light from a light source 31 through a polarization generator system 32, an optional registration pattern panel 40 and a beam shaping group 33 to reach an extended area of a sample 10. In FIG. 4, the sample 10 is a convex surface, but it could also be flat, concave or a freeform surface. Preferably, the beam shaping group could be selected to match the shape of the sample under test. For example, if the sample is convex, a positive lens group could be used as the beam shaping group; if the sample is concave, a negative lens group is preferred as the beam shaping group. In one preferred embodiment of the light source 31 as shown in FIG. 4, it comprises one broadband light source 34, an illuminator condenser lens 35, and an illuminator collimation lens 36. One preferred embodiment of the broadband light source 34 is a single high radiant output light-emitting diode (LED), such as the Thorlabs MBB1L3 broadband LED. Alternatively, the broadband light source could also comprise an array of LEDs with different spectral output such that the total spectral output is broadband. Similar to FIG. 1, the embodiment of the broadband light source could also comprise other light sources, such as tungsten-halogen lamps, mercury lamps, xenon lamps, metal halide lamps, liquid-crystal displays (LCDs), organic light-emitting diodes (OLEDs), superluminescent diodes (SLDs), supercontinuum lasers, and a combination of multiple lasers (preferably aligned coaxially with beamsplitters), etc. In some embodiments of these light sources, a spherical or conical reflecting mirror could be integrated in the lamphouse to improve the directionality of the light source. Further, one embodiment of the illuminator condenser lens 35 is a molded aspheric condenser lens, and preferably the light output after the illuminator collimation lens 36 is collimated or quasi-collimated. In some embodiments, there is a spatial filter (not shown) in between the illuminator condenser lens 35 and the illuminator collimation lens 36, at the front focal plane of 36, such that the collimation of the beam after the illuminator collimation lens 36 could be improved. The polarization generator system 32 comprises a linear polarizer 37, a first variable retarder 38, and a second variable retarder 39. The fast axes of 38 and 39 are oriented at 45° to each other. The variable retarders could be liquid crystal variable retarders (LCVR), or a pair of Babinet-Soleil compensators, or a pair of photo-elastic modulators (PEMs), or electro-optical modulators, or magneto-optical modulators. If LCVRs are used, the birefringence of the LCVRs could be electronically adjusted by varying the voltage across the liquid crystals. Optionally, light passes through a registration pattern panel 40 after the polarization generator system 32. Similar to the case in FIG. 1, the illuminator could further comprise an optional symmetric group 41, with 30 and 41 being symmetric with respect to the system optical axis 42. Preferably, both the azimuthal angle and the polar angle of the illuminator could be adjusted with respect to the system optical axis 42 by a rotatable arm.

As illustrated by a ray 240, after the beam shaping group 33, light reaches an extended area of a sample 10. An image of the sample surface under test is formed by an imaging system 43. The imaging system 43 in FIG. 4 comprises an objective group 44, a polarization analyzer system 45, and a focusing group 49. Preferably, light from a point on the sample is substantially collimated after the objective group 44. One preferred embodiment of the polarization analyzer system 45 comprises a variable retarder 46, another variable retarder 47 and a linear analyzer 48. The fast axes of 46 and 47 are at 45° to each other. The polarization analyzer system 45 is similar to the polarization generator system 32 but usually with optical elements positioned in reverse sequence as in 32. Alternatively, the polarization analyzer system 45 could also be any other previously disclosed embodiments of a polarization analyzer system. The detection system 50 in FIG. 4 is similar to 19 in FIG. 1, which consists of a dichroic beamsplitter 51, a first detector 52 sensitive to the visible spectrum, and a second detector 53 sensitive to the infrared spectrum. Both the visible and infrared detectors could comprise a plurality of spectral channels.

The main advantage of the embodiment in FIG. 4 is that there are no mechanically moving parts when adjusting polarization setups. The variable retarders, such as LCVRs could be adjusted electronically, which generally tends to be much faster and more robust with a more relaxed alignment requirement, compared to mechanically adjusted polarization components, such as a rotating polarizer or a rotating retarder. This increased imaging speed is especially important for imaging of a dynamically evolving thin film sample, such as the tear film of a human eye.

Similar to FIG. 1, the illuminator 30 or the sample 10 in FIG. 4 could be rotated such that the azimuthal angle of either the illuminator or the sample could be adjusted.

Figure 5:
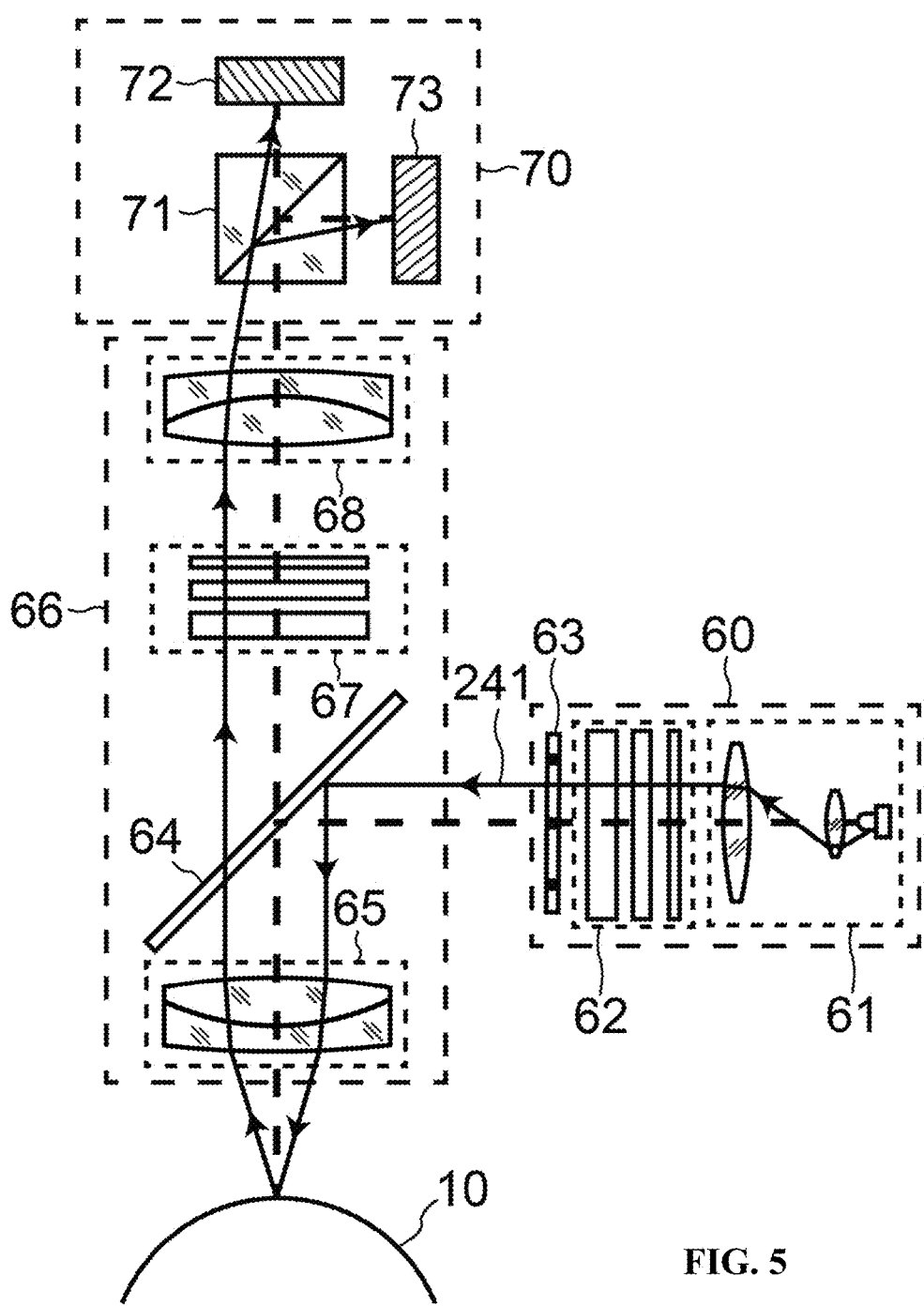
FIG. 5 presents Embodiment 4 of the device for thin film spectroellipsometric imaging, where the illumination setup is rearranged.

FIG. 5 presents Embodiment 4 of the device for thin film spectroellipsometric imaging, where the illumination setup is rearranged, compared with Embodiment 3. An illuminator 60 comprises a light source 61, a polarization generator system 62, and an optional non-polarizing registration pattern panel 63. Preferably, the light output from the light source 61 is substantially collimated. The polarization generator system 62 is similar to 32 in FIG. 4, which could comprise a linear polarizer and two variable retarders (such as LCVRs) with fast axes oriented at 45° to each other. All other disclosed embodiments of the polarization generator system could also apply to 62. As illustrated by a ray 241, a non-polarizing beamsplitter 64 directs light through a beam shaping group 65 to reach an extended area of a sample 10. In FIG. 5, the sample 10 is a convex surface, hence a positive lens group is used as a preferred beam shaping group. If the sample is a concave surface, a negative lens group might be preferred. Further, the sample could have a freeform surface under measurement. The reflected light from the sample is collected by an imaging system 66. In a preferred embodiment as shown in FIG. 5, the imaging system 66 comprises a beam shaping group 65, a non-polarizing beamsplitter 64, a polarization analyzer system 67, and a focusing group 68. The polarization analyzer system 67 is similar to 45 in FIG. 4, which could comprise two variable retarders (such as LCVRs) with fast axes mutually oriented at 45°, and a linear analyzer. All other disclosed embodiments of the polarization analyzer system could also apply to 67, which could be embodiments of the polarization generation system 62 in reverse order. The beam shaping group 65 and the focusing group 68 in FIG. 5 are lens groups, but they could also be mirror groups or catadioptric groups in some other embodiments. After the imaging system 66, light reaches a detection system 70, which consists of a dichroic beamsplitter 71, a first detector 72 sensitive to the visible spectrum, and a second detector 73 sensitive to the infrared spectrum. Both the visible and infrared detectors could comprise a plurality of spectral channels or a series of detectors responsive to different spectral ranges.

In another embodiment, the non-polarizing beamsplitter 64 in FIG. 5 could be a holed mirror with an annular shape. The annular mirror is part of the illumination pathway, and the aperture in the center of the holed mirror is part of the imaging pathway. The aperture of this holed mirror is matched with the aperture stop and vignetting requirements of the rest of the optical system.

Figure 6:
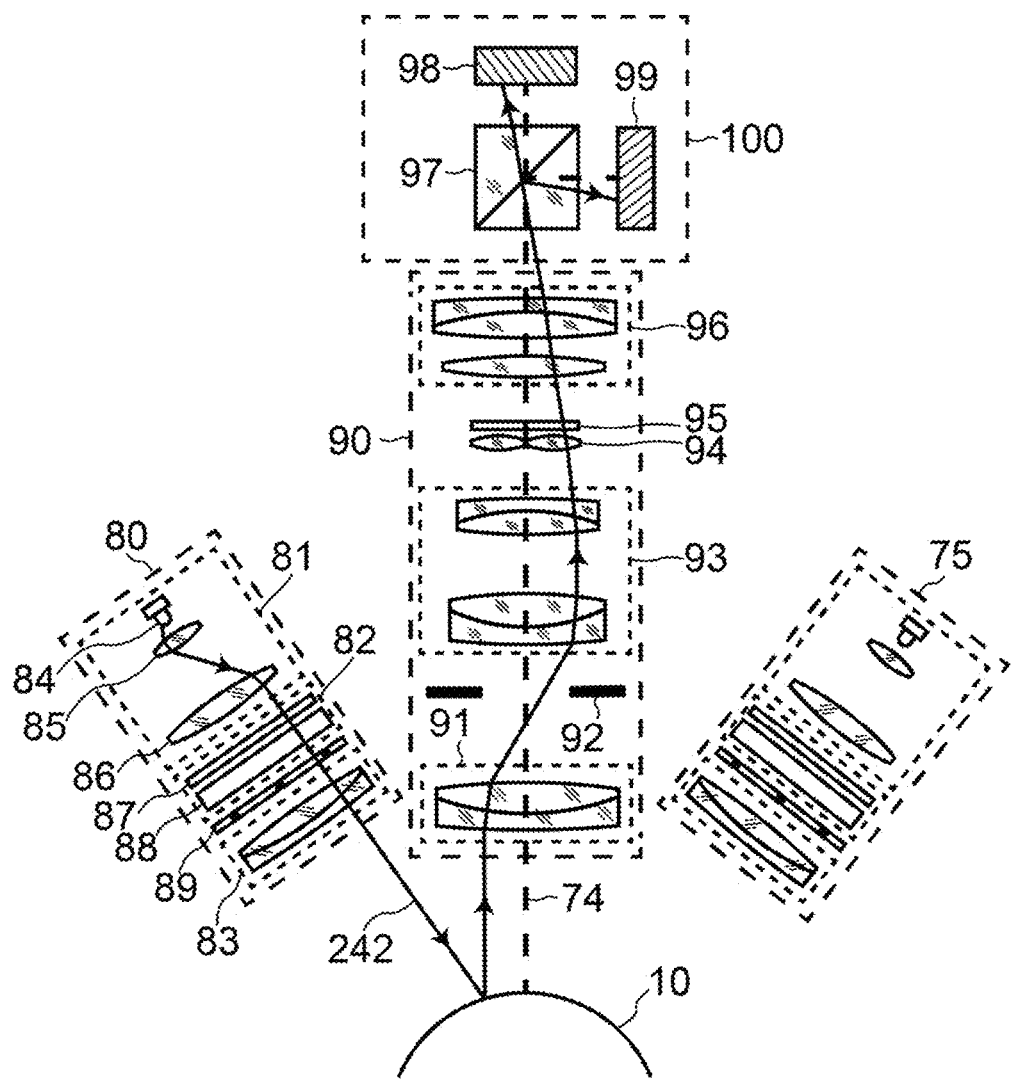
FIG. 6 presents Embodiment 5 of the device for thin film spectroellipsometric imaging, where a division of aperture ellipsometric system is used.

FIG. 6 presents Embodiment 5 of the device for thin film spectroellipsometric imaging, where a division of aperture ellipsometric system is used. Preferably, an illuminator 80 comprises a light source 81, a polarization generator system 82, an optional registration pattern panel 89, and a beam shaping group 83. Alternatively, all the previously disclosed embodiments of the illuminator and its components could also be employed. One preferred embodiment of the light source 81 is similar to the light source 31 in FIG. 4, which comprises one broadband light source 84, an illuminator condenser lens 85, and an illuminator collimation lens 86. Preferably the light output after the illuminator collimation lens 86 is substantially collimated. The polarization generator system 82 comprises a linear polarizer 87 and a rotating retarder 88. Preferably, the rotating retarder 88 is a rotating achromatic (broadband) quarter-wave plate. The optional registration pattern panel 89 could be an independent panel as in FIG. 6, or it could be integrated in the polarization generator system in some other embodiments. After the beam shaping group 83, light reaches an extended area of a sample 10, as illustrated by an exemplary ray 242.

Similar to the case in FIG. 1, the illuminator could further comprise an optional symmetric group 75, with 80 and 75 being symmetric with respect to the system optical axis 74. Preferably, the illuminator is positioned with an azimuthal angle and a polar angle which are adjustable. More preferably, the sample could be rotated so that its azimuthal angle could also be adjusted.

In Embodiment 5, an imaging system 90 comprises an objective lens group 91, a field stop 92, a collimation lens group 93, a 2×2 sub-aperture lens array 94, a 2×2 analyzer array 95, and a focusing lens group 96. The field stop 92 is conjugate to both the object plane and the image plane, and it is used to limit the field coverage such that there is no overlap of images on the detector focal plane from different field points through adjacent sub-aperture lenses. The collimation lens group 93 projects the entrance pupil of the objective lens group 91 onto the sub-aperture lens array 94. Also, the ray bundle from each field point is substantially collimated after the collimation lens group 93. The 2×2 sub-aperture lens array 94 evenly divides the aperture into four sub-apertures with different polarization analyzers in the analyzer array 95. The analyzer array 95 functions as the polarization analyzer system. The focusing lens group 96 is used to form images on a detection system 100. The detection system 100 is similar to the detection system 19 in FIG. 1, and it includes a dichroic beamsplitter 97, a first detector 98 sensitive to the visible spectrum, and a second detector 99 sensitive to the infrared spectrum. Both the visible and infrared detectors could comprise a plurality of spectral channels or detectors responsive to different spectral ranges.

Sometimes, there is some residual misalignment of the images formed by each sub-aperture, and digital registration is usually done to reduce pixel misalignment error. Digital registration is usually based on calibration data of known objects. Alternatively, it could also be done based on the overlap of images from sub-apertures through convolution or similar algorithms.

FIG. 7 presents different embodiments of the 2×2 analyzer array 95. FIG. 7(a) presents a 2×2 analyzer array, which comprises four different linear analyzers in the four sub-apertures, including a horizontal (0°) linear analyzer 101, a 45° linear analyzer 102, a vertical (90°) linear analyzer 103, and a 135° linear analyzer 104. These sub-aperture analyzers could be composed of sub-wavelength metal gratings, iodide-doped polyvinyl alcohol-based micropolarizer arrays, liquid crystal micropolarizer arrays, or dielectric metasurfaces, etc. Note that the linear orientation in FIG. 7 is only representative to the direction along which the polarized light could transmit through the analyzer. If the analyzers are formed with metal gratings, the transmission axis is generally perpendicular to the grating finger directions. FIG. 7(a) is capable of analyzing the linear polarization states of the output beam, i.e. the first three Stokes components $[S_0, S_1, S_2]^T$ of the Stokes vector of the output beam (The superscript "T" stands for "transpose").

FIG. 7(b)-(d) present three embodiments of the 2×2 analyzer array which are able to measure the full Stokes vector of the output beam. FIG. 7(b) comprises two linear analyzers, and two circular analyzers in the four sub-apertures. They are a 0° horizontal linear analyzer 105, a 90° vertical linear analyzer 106, a right-hand circular analyzer 107, and a left-hand circular analyzer 108. FIG. 7(c) also comprises two linear analyzers, and two circular analyzers in the four sub-apertures. They are a 45° linear analyzer 109, a 135° linear analyzer 110, a right-hand circular analyzer 111, and a left-hand circular analyzer 112. FIG. 7(d) comprises three linear analyzers, and one circular analyzers in the four sub-apertures. They are a 30° linear analyzer 113, a 90° linear analyzer 114, a 150° linear analyzer 115, and a left-hand circular analyzer 116. Note that throughout this disclosure, the direction of polarization (including that of circular polarization) is defined from the perspective of the detector.

Preferably, all these four sub-aperture analyzers in FIG. 7(b)-(d) are configured with the same materials, a linear polarizer and a quarter-wave plate. A left-hand circular polarizer consists of a linear polarizer and a quarter-wave plate, where the fast axis direction of the quarter-wave plate is rotated 45° counterclockwise with respect to the transmission axis of the linear polarizer. In contrast, a right-hand circular polarizer consists of a linear polarizer and a quarter-wave plate, where the fast axis direction of the quarter-wave plate is rotated 45° clockwise with respect to the transmission axis of the linear polarizer. Analyzers 105, 106, 109, 110, 113, 114, and 115 are preferably configured as FIG. 7(e) so that the linear polarizer is facing toward the incident light (denoted by the arrow), and the quarter-wave plate is at the back closer to the detector. This is the standard setup for a circular polarizer, and the light output after the setup in FIG. 7(e) will be circularly polarized. However, as part of the 2×2 analyzer array, analyzers 105, 106, 109, 110, 113, 114, and 115 all function as linear analyzers. In contrast, analyzers 107, 108, 111, 112, and 116 are configured by flipping the same type of circular polarizers, so that the quarter-wave plate is facing toward the incident light, and the linear polarizer is at the back closer to the detector, as shown in FIG. 7(f). After flipping, the original left-hand circular polarizer functions as a left-hand circular analyzer, which could transmit left circularly polarized light, but extinguish right circularly polarized light. Similarly, after flipping, the original right-hand circular polarizer functions as a right-hand circular analyzer, which could transmit right circularly polarized light, but extinguish left circularly polarized light.

It is possible to use another configuration, where analyzers 105, 106, 109, 110, 113, 114, and 115 are composed of linear polarizers only, without the quarter-wave plate at the back. However, the benefit of using the configuration of FIG. 7(e)-(f), is that the absorption spectra of all four analyzers are the same, which simplifies radiometric calibration, and improves the measurements accuracies.

Specifically, it's preferable that all these four sub-aperture analyzers in FIG. 7(d) are configured from one type of left-hand circular polarizer. 113, 114, and 115 are left-hand circular polarizers function as linear analyzers, whereas 116 is a left-hand circular analyzer, configured by flipping the same type of left-hand circular polarizer, so that the quarter-wave plate is facing the incident light.

Similar to the configuration in FIG. 7(d), the 2×2 analyzer array could also comprise three right circular polarizers and a reversed right circular polarizer, or three right circular polarizer and a reversed left circular polarizer, or three left circular polarizer and a reversed right circular polarizer, etc.

Figure 8:
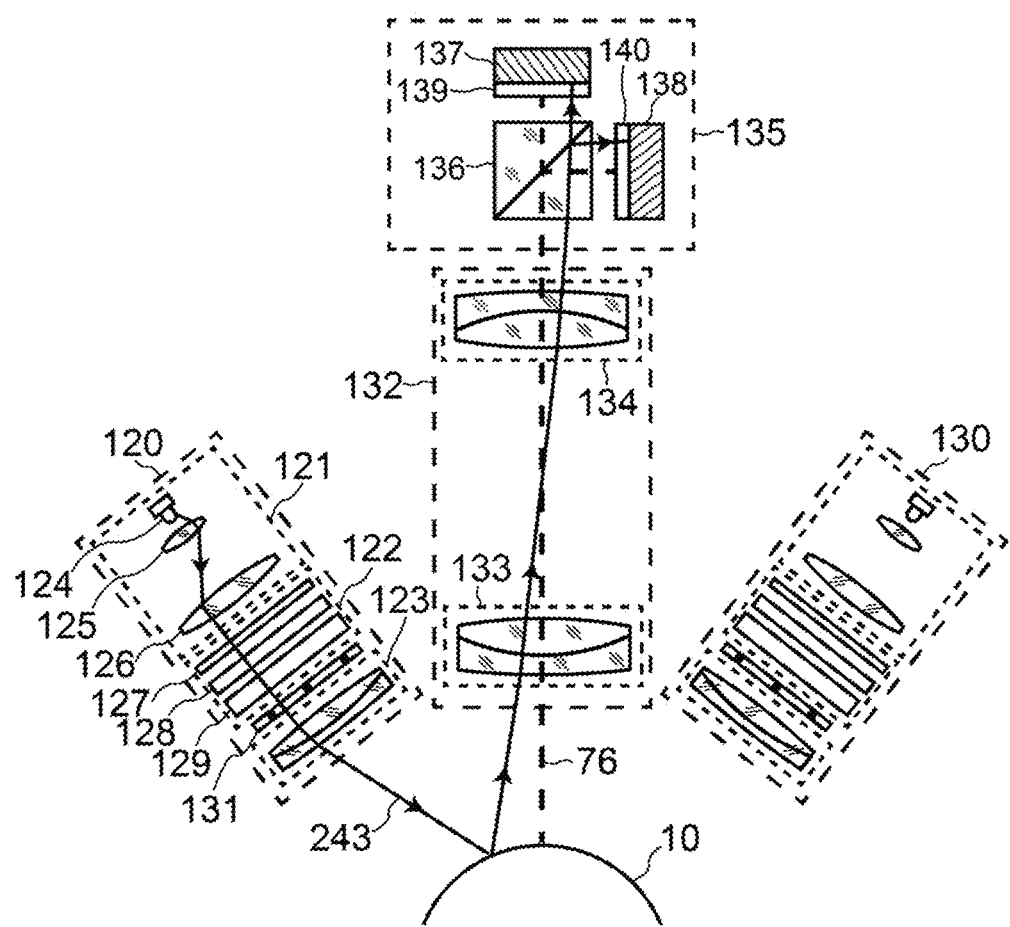
FIG. 8 presents Embodiment 6 of the device for thin film spectroellipsometric imaging, where the polarization analyzer system is integrated in the detection system, instead of being in the imaging system.

FIG. 8 presents another embodiment, Embodiment 6 of the device for thin film spectroellipsometric imaging, where the polarization analyzer system is integrated in the detection system, instead of being in the imaging system. The illuminator in FIG. 8 is similar to that in FIG. 4. The illuminator 120 directs light from a light source 121 through a polarization generator system 122, an optional registration pattern panel 131, and a beam shaping group 123 to reach a sample 10. In FIG. 8, the sample 10 is a convex surface, but it could also be flat, concave or a freeform surface. One preferred embodiment of the light source 121 comprises one broadband light source 124, an illuminator condenser lens 125, and an illuminator collimation lens 126. Preferably the light output after the illuminator collimation lens 126 is substantially collimated. The polarization generator system 122 comprises a linear polarizer 127, a first variable retarder 128, and a second variable retarder 129. The fast axes of 128 and 129 are oriented at 45° to each other. The variable retarders could be liquid crystal variable retarders (LCVRs), or a pair of Babinet-Soleil compensators, or a pair of photo-elastic modulators (PEMs) or electro-optical modulators, or magneto-optical modulators, etc. Preferably, the beam shaping group could be chosen to match the shape of the sample under test, and the beam shaping group 123 in FIG. 8 is a positive lens group to match the convex surface of the sample.

The illuminator could further comprise an optional symmetric group 130, with 120 and 130 being symmetric with respect to the system optical axis 76. Preferably, the illuminator could adjust the illumination polar angle with respect to the system optical axis by a rotatable arm. More preferably, either the illuminator or the sample could be rotated so that the azimuthal angle could be adjusted.

As illustrated by a ray 243, after the beam shaping group 123, light reaches a sample 10, and then the reflected light passes through an imaging system 132. An image of the sample surface under test is formed by the imaging system 132, which comprises an objective group 133 and a focusing group 134.

Light then reaches a detector system 135. The geometric setup of the detection system 135 is similar to that of the detection system 19 in FIG. 1. The detection system 135 comprises a dichroic beamsplitter 136, a first detector 137 sensitive to the visible spectrum, and a second detector 138 sensitive to the infrared spectrum. The visible detector 137 could have red, green, and blue (RGB) three color channels, and the infrared detector 138 could have one or more infrared channels. Unlike FIG. 1, the detectors in 135 each comprises a polarization sensitive layer. The polarization sensitive layer could be a micropolarizer layer, a micro-retarder layer or a combination of a micropolarizer layer and a micro-retarder layer. A polarization sensitive layer 139 is integrated on the first detector 137, and another polarization sensitive layer 140 is integrated on the second detector 138. Each polarization sensitive layer comprises a plurality of analyzers. Hence the polarization analyzer system is fabricated on chip in the detection system. If the polarization sensitive layer is a micropolarizer layer, it could be composed of sub-wavelength metal gratings, iodide-doped polyvinyl alcohol-based micropolarizer arrays, or liquid crystal micropolarizer arrays, etc. One type of the polarization analyzer system integrated on chip comprises four adjacent pixels with 0°, 45°, 90°, and 135° four different polarization orientation, and these adjacent two by two pixels form a unit cell for polarization analysis, similar to the basic layout in FIG. 7(a). One embodiment of this type of polarization image sensor to work in the visible and near infrared spectra is the Sony IMX250MZR/MYR sensor or Sony IMX253MZR/MYR sensor. These Sony polarization image sensors have four different directional linear polarizers, and this type of linear micropolarizer sensor could only measure the first three components $[S_0, S_1, S_2]^T$ of the Stokes vector of the output beam. If the full Stokes vector ($[S_0, S_1, S_2, S_3]^T$) analysis of the output beam is necessary, a combination of micropolarizer and micro-retarder based polarization image sensors could be used as the polarization sensitive layer. Alternatively, dielectric metasurfaces could be used for full-Stokes vector analysis of the output beam.

It is important to point out all of the embodiments of the 2×2 analyzer array in FIG. 7(a)-(d) and other described embodiments of the division-of-aperture polarization analyzer array could be scaled down, and treated as embodiments of a "unit cell", sometimes also called a "super pixel", to be used in the polarization sensitive layers of 139 and 140 in FIG. 8. The unit cells or the super pixels are the smallest polarization analyzing units in a polarization sensitive layer. A repetitive pattern of these unit cells, each consisting a 2×2 analyzer array, could be fabricated on chip to function as the polarization analyzer system in the detection system, and enable imaging ellipsometry measurements. These types of embodiments with the polarization analyzer system in the detection system constitute the division of focal plane ellipsometric imaging devices.

A plurality of spectral channels in the detectors could be used, and the unit cells could be a combination of several spectral channels, each with a 2×2 analyzer array. For example, in the visible detector, a RGBG Bayer filter could be used, and for each of the three colors, a 2×2 analyzer array could be used, hence in total, each unit cell comprises 16 individual pixels. Alternatively, in another embodiment of the detection system, the 2×2 polarization analyzer array of the polarization sensitive layer could be maintained, but for each polarization analyzer, there is a RGBG Bayer filter to further analyze the visible color channels, and each until cell still comprises 16 individual pixels. The infrared detector could have similar spectropolarimetric layout.

Figure 9:
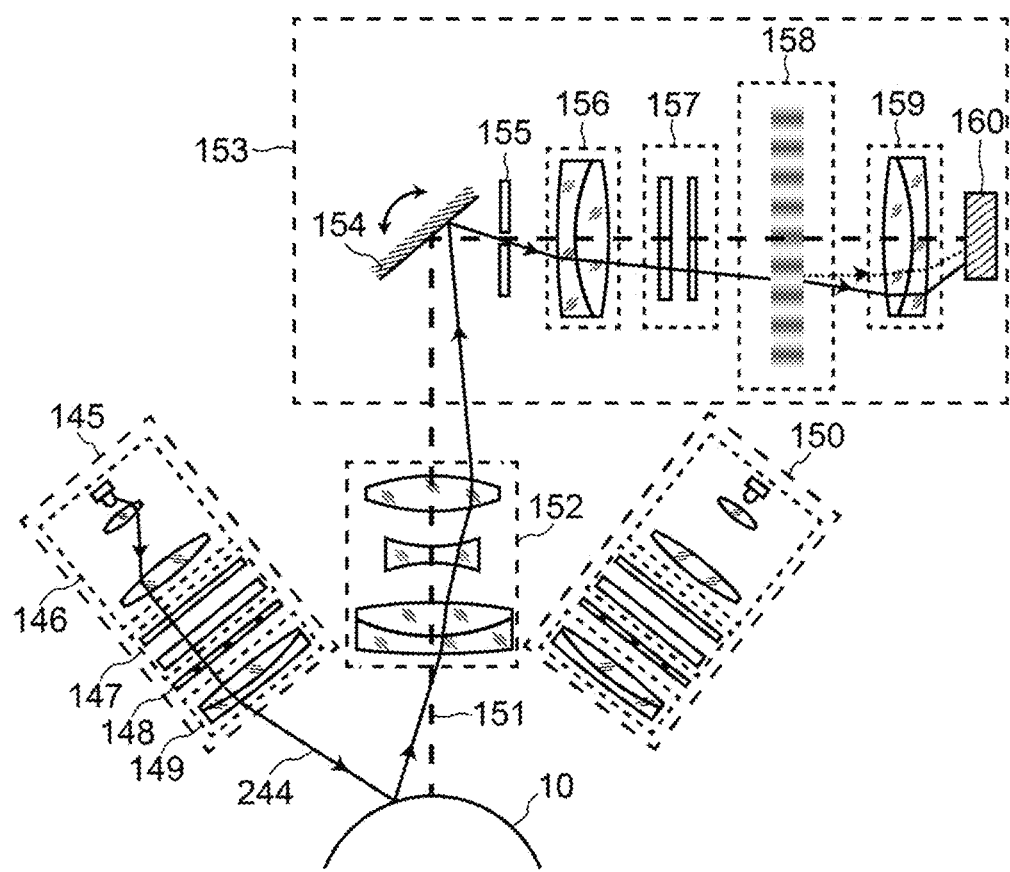
FIG. 9 presents Embodiment 7 of the device, where the detection system is a transmissive spectrometer system.

FIG. 9 presents another embodiment, Embodiment 7 of the disclosed device, which is a hyperspectral imaging device, where the detection system is a transmissive imaging spectrometer system. An illuminator 145 directs light from a light source 146 through a polarization generator system 147, an optional registration pattern panel 148, and a beam shaping group 149. The illuminator 145 in FIG. 9 is similar to 80 in FIG. 6, though the embodiments of the illuminator 145 could be any of the previously disclosed illuminator embodiments. Preferably, light is substantially collimated after the light source 146 and before entering the polarization generator system 147. The polarization generator system 147 could be any embodiment of the previously disclosed polarization generator system, and the specific embodiment in FIG. 9 comprises a linear polarizer and a rotating retarder. Preferably, the beam shaping group 149 is chosen to match the sample surface under test. The illuminator could further comprise an optional symmetric group 150, with 145 and 150 being symmetric with respect to the system optical axis 151. Preferably, the illuminators could adjust both the polar angle and the azimuthal angle with respect to the optical axis 151 of the system with a rotatable arm. Light from the broadband illuminator then reaches an extended area of a sample 10. In FIG. 9, the sample 10 has a convex surface, hence a positive group in the beam shaping group 149 is preferred. In some embodiments, the sample 10 could be azimuthally rotated with respect to the optical axis 151.

Light reflected or transmitted from the sample is collected by an imaging system 152, as shown by an exemplary ray 244. The imaging system 152 could be a lens system, a mirror system or a catadioptric system. After the imaging system 152, light enters a detection system 153, which is a transmissive spectrometer system. In a preferred embodiment of the transmissive spectrometer system 153, light is reflected by a rotatable scanning mirror 154, which guides light to a slit 155. One preferred embodiment of the scanning mirror 154 is a rotatable polygon scanner. Preferably, the slit 155 is located at the image plane of the preceding imaging system 152, and it spatially filters out one slice of the object to avoid overlap of dispersed beams from two spatial dimensions. Light further passes through a collimating lens group 156, a polarization analyzer system 157, a transmission grating 158, and a focusing group 159. In a preferred embodiment, 158 is a volume phase holographic (VPH) transmission grating as shown in FIG. 9. The embodiment of the transmission grating 158 could also be a diffractive lens, a prism, a Bragg grating, or other functionally similar dispersion elements. Light then passes a focusing group 159 and reaches a detector 160. The detector 160 could be a charge-coupled device (CCD), a complementary metal oxide-semiconductor (CMOS), or other functionally similar image recording devices. The polarization analyzer system 157 could also be fabricated on chip in the detector 160 as previously shown in FIG. 8. In some embodiments, the detector element 160 comprises a plurality of detectors in order to detect a broad wavelength range. For example, the detection system could comprise a dichroic mirror with a silicon-based visible-near infrared (VNIR) detector and an InSb-based or InGaAs-based short-wave infrared (SWIR) detector. Typically, the detection system could be used to obtain hundreds or thousands of or even more spectral channels for hyperspectral imaging.

Such a hyperspectral imaging device combines imaging with spectroscopy. Each image is a line on the sample constraint by the slit 155, spreading out at different spectral channels. With the scanning mirror 154 continuously rotating and scanning the sample, a two-dimensional image of the sample and a third dimension of the spectrum could be recorded and subsequently analyzed.

Figure 10:
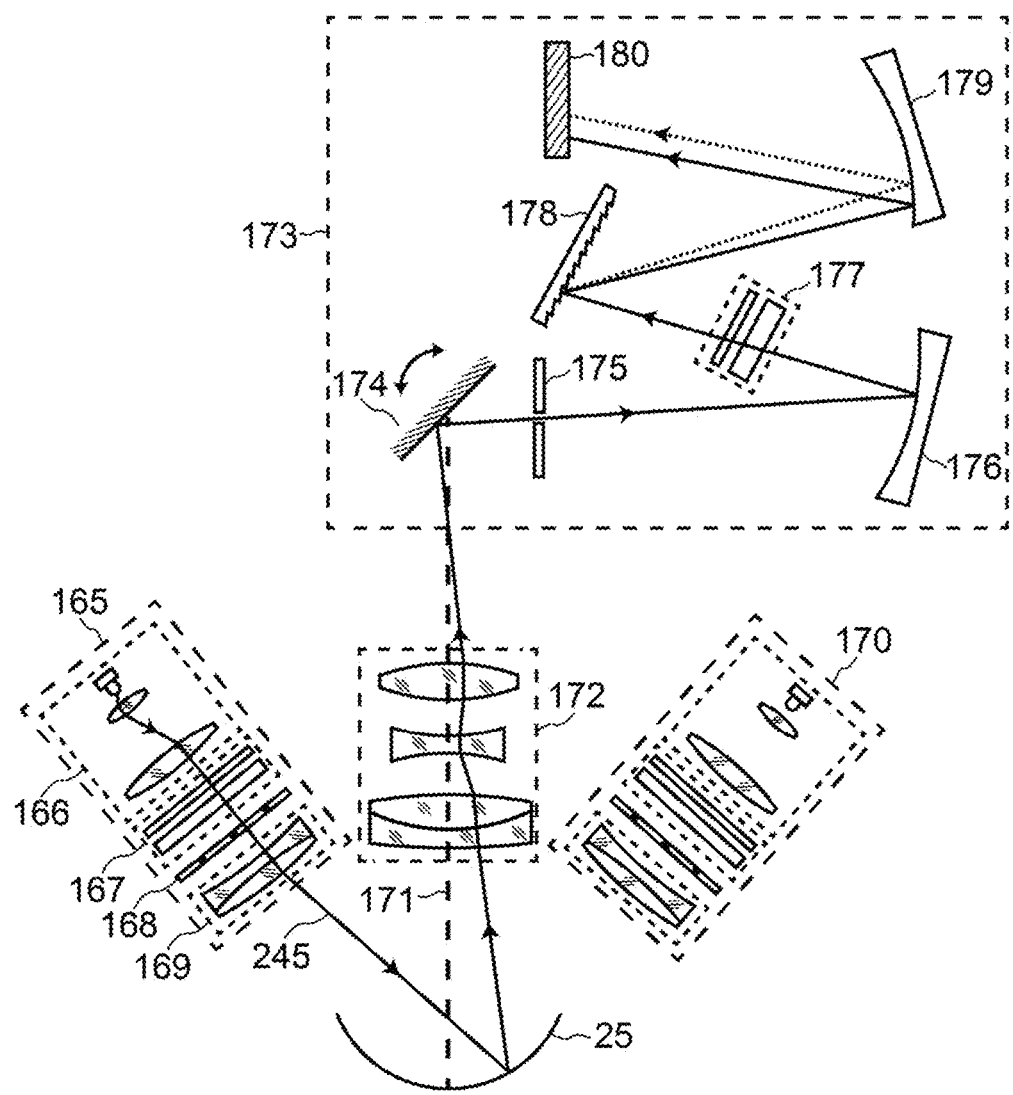
FIG. 10 presents Embodiment 8 of the device, where the detection system is a reflective spectrometer system.

FIG. 10 presents another embodiment, Embodiment 8 of the disclosed device, which is a hyperspectral imaging device, where the detection system is a reflective imaging spectrometer system. The illumination setup is similar to that in FIG. 9. An illuminator 165 comprises a light source 166, a polarization generator system 167, an optional registration pattern panel 168, and a beam shaping group 169. The illuminator could further comprise an optional symmetric group 170, with 165 and 170 being symmetric with respect to the optical axis 171. Preferably, the illuminator could adjust both the polar angle and the azimuthal angle with respect to the optical axis 171 of the system with a rotatable arm to achieve a large range of incident angles. Reflected light from a sample 25 is collected by an imaging system 172, as shown by a ray 245. In FIG. 10, the sample 25 has a concave surface, and the beam shaping group 169 is preferably a negative lens group. In some embodiments, the sample 25 could be azimuthally rotated with respect to the optical axis 171. The imaging system 172 forms images of the sample 25. The detection system is a reflective spectrometer system 173, which follows the imaging system 172. The spectrometer system 173 could have many different configurations. In FIG. 10, a Czerny-Turner configuration is illustrated as one preferred embodiment. A rotatable scanning mirror 174 guides light to a slit 175. One preferred embodiment of the scanning mirror 174 is a rotatable polygon scanner. The slit 175 is preferably located at an intermediate image plane of the preceding imaging system 172 to spatially filter the intermediate image of the sample and maintain only one spatial dimension at a time, in order to avoid overlap of dispersed beams from two spatial dimensions. A collimating mirror 176 turns the input beam from the slit 175 into a substantially collimated beam before reaching a polarization analyzer system 177 and a grating 178. The polarization analyzer system 177 could be any embodiment of the previously disclosed polarization analyzer system, and the specific embodiment in FIG. 10 comprises a rotating retarder and a linear analyzer. Light of different wavelengths disperse into different directions after diffraction from the grating 178, and reaches a focusing mirror 179, which directs different wavelengths onto different regions on a detector 180. The images recorded in the detector 180 contain one spatial dimension and one spectral dimension. The detector 180 could be a CCD, CMOS, or other functionally similar image recording device. Alternatively, the detector could also be a polarization image sensor, with the polarization analyzer system integrated on chip to replace 177 in FIG. 10. Further, similar to the detector element 160 in FIG. 9, the detector element 180 could comprise a plurality of detectors responsive to different spectral ranges in order to detect a broad wavelength range simultaneously.

Note that other spectrometer configurations such as a Littrow configuration, an Ebert-Fastie configuration, etc. are also possible. Further, the grating in FIG. 10 could be ruled on a concave or convex surface, and correspondingly, an Eagle spectrometer, a Wadsworth spectrometer, a Dyson spectrometer (which is a catadioptric spectrometer), or other similar configurations could be used.

Figure 11:
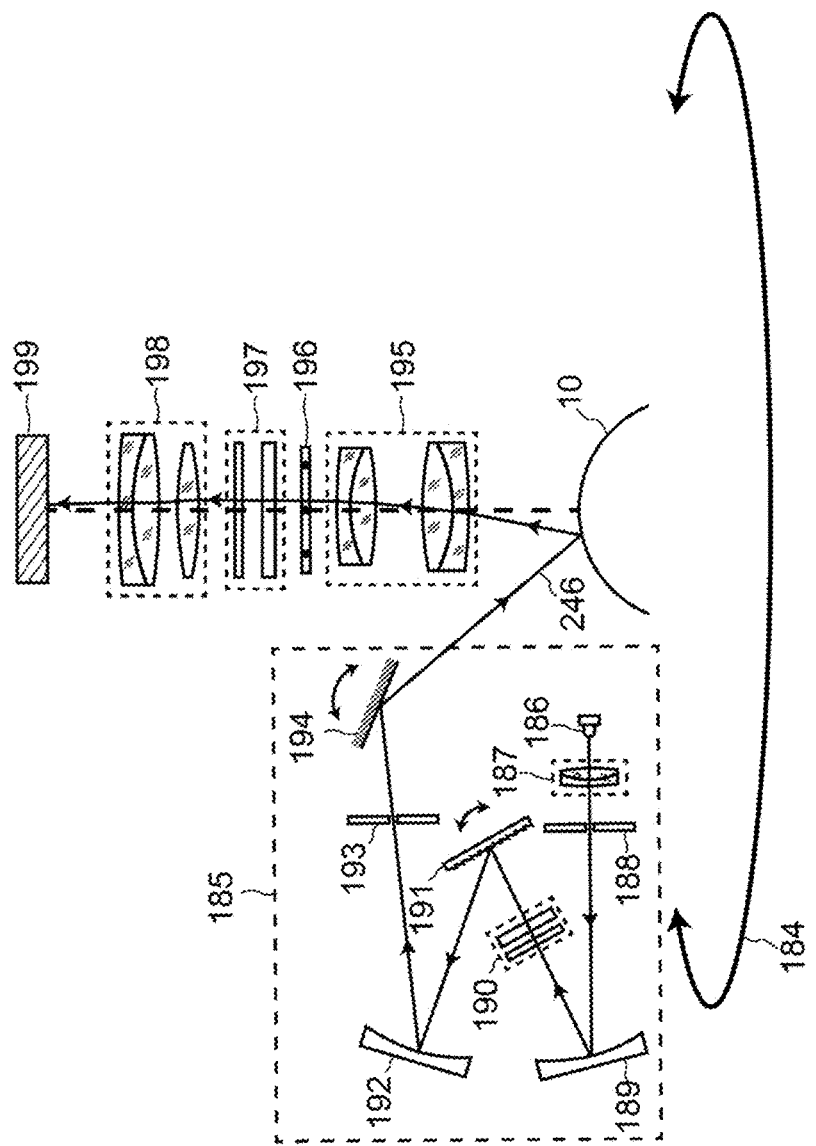
FIG. 11 presents Embodiment 9 of the device, where the illuminator is a monochromator.

FIG. 11 presents another embodiment, Embodiment 9 of the disclosed device, where the illuminator is a monochromator. The monochromator could be based on any of the previously disclosed spectrometer configurations. In one preferred embodiment as shown in FIG. 11, the illuminator 185 is a monochromator of Czerny-Turner configuration comprises a broadband light source 186, an illuminator condenser lens 187, an entrance slit 188, a collimating mirror 189, a polarization generator system 190, a grating 191, a focusing mirror 192, an exit slit 193, and a scanning mirror 194. Preferably, the grating 191 could be rotated such that the illumination wavelength from the exit slit 193 could change with the rotation of the grating 191. The polarization generator system 190 could comprise a polarizer and rotating retarder as shown in FIG. 11, and it could also be any of the other disclosed embodiment of the polarization generator system. Further, the scanning mirror 194 could be rotated to achieve a line scan movement of the illumination beam on the sample 10. In a preferred embodiment, either the illuminator 185 or the sample 10 could be rotated azimuthally, as indicated by the double arrowed line 184, to enlarge the illumination coverage area on the sample. For the special case of measurement of the tear film of a human eye, the azimuthal adjustment of the illuminator is preferred, since it's inconvenient to adjust the subject's eye azimuthally.

After reflection off the sample 10, light enters a collimating group 195 as shown by an exemplary ray 246. Preferably, light from each object point is substantially collimated after the collimating group 195. Light then passes through an optional registration pattern panel 196, a polarization analyzer system 197, a focusing group 198, and reaches a detection system 199. Elements 195 to 198 together constitute the imaging system of this embodiment. Note that the registration pattern panel 196 is placed close to the polarization analyzer system 197 instead of the polarization generator system in this embodiment. In some other embodiments, the registration pattern panel could be integrated as part of the polarization analyzer system by controlling some subareas to be of different polarization output than the rest of the polarization analyzer system. The polarization analyzer system 197 comprises a rotating retarder and a linear analyzer, though it could also be any other disclosed embodiment of the polarization analyzer system. The detection system 199 could be a single detector as shown in FIG. 11, or it could comprise a plurality of detectors responsive to different spectral ranges in order to detect a broad wavelength range simultaneously.

Figure 12:
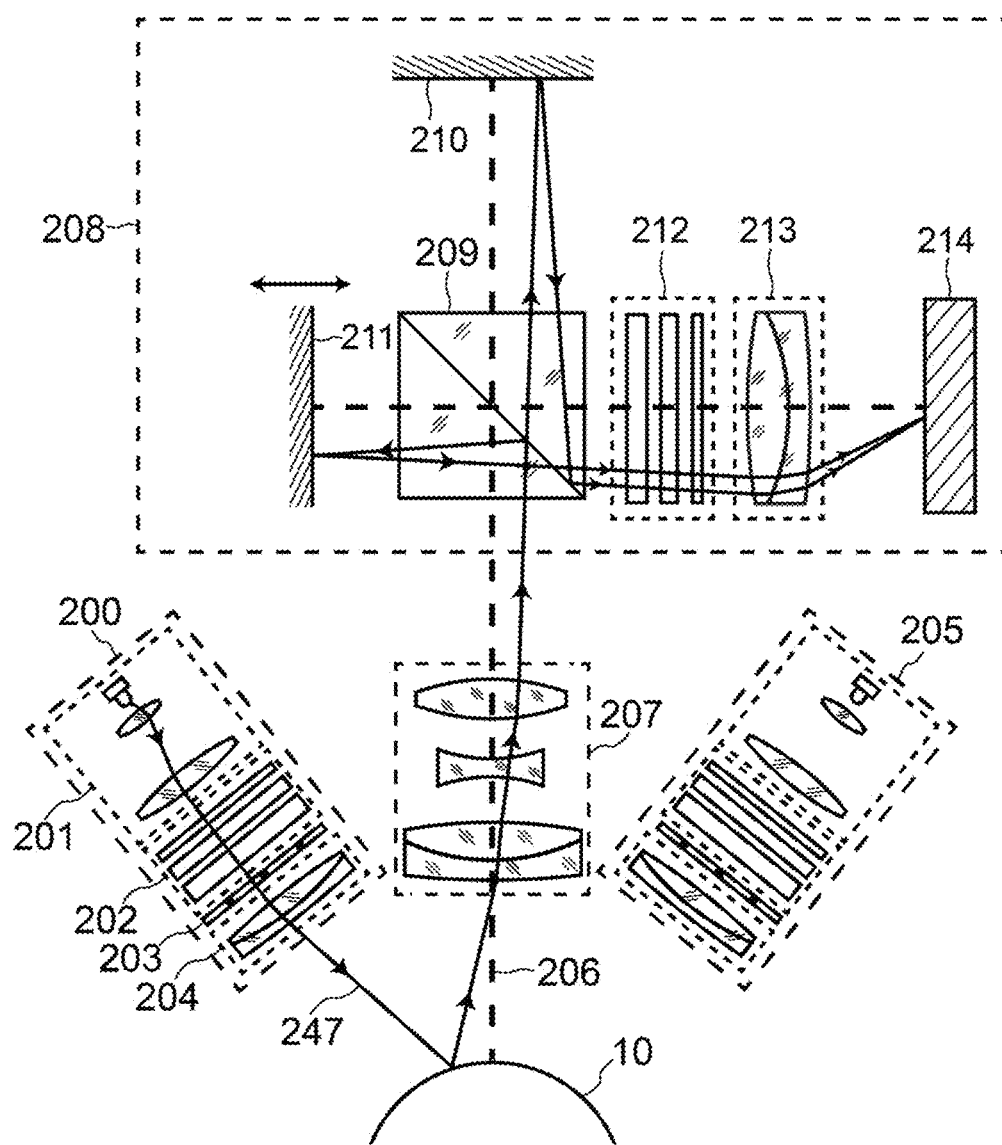
FIG. 12 presents Embodiment 10 of the device, which comprises an imaging Fourier transform spectrometer system.

FIG. 12 presents another embodiment, Embodiment 10 of the disclosed device, which comprises an imaging Fourier transform spectrometer system. An illuminator 200 comprises a light source 201, a polarization generator system 202, an optional registration pattern panel 203, and a beam shaping group 204. The illuminator could further comprise an optional symmetric group 205, with 200 and 205 being symmetric with respect to the optical axis 206. Preferably, the illuminator could adjust both the polar angle and the azimuthal angle with respect to the optical axis 206 with a rotatable arm to achieve a large range of incident angles. After reflection off the sample, light enters an imaging system 207, as shown by the ray 247. The imaging system 207 collimates light from each point in the object plane of the sample into a beam bundle along a certain direction. The collimated beam enters a detection system 208, where the incident collimated beam is split at a beamsplitter 209, which directs a fraction of the beam toward a stationary mirror 210, and the other fraction of the beam toward a moving mirror 211 mounted on a motorized stage (moving direction shown by the arrow). Preferably, 209 is a non-polarizing beamsplitter. There are many possible embodiments of the beamsplitter 209, including but not limited to a cube beamsplitter, a plate beamsplitter, a pellicle beamsplitter, and a diffractive beamsplitter. The reflected beams from the two mirrors both partially go through the beamsplitter 209 again and further pass through a polarization analyzer system 212. The beams then enter a focusing group 213 and form an interferogram on a detector 214. Before entering 213, the reflected beams from the same object point reflected by mirrors 210 and 211 would have the same direction (though a lateral shear between these two beams is possible due to the movement of 211, as shown in FIG. 12), hence they would be recombined on the same image point at the detector 214. Each pixel at 214 would record the interference of the two beams. In this setup, the detection system 208 is a polarimetric imaging Fourier transform spectrometer system. The resultant interferograms are recorded by the broadband detector 214. With the movement of the moving mirror 211, usually driven by a step motor, the optical path difference (OPD) of the two beams could be varied, and the detector 214 will record a sequence of interferograms. With Fourier transform of the time evolution of the signal at each pixel, the spectrum at each object point could be revealed.

In order to obtain ellipsometric information of the sample, a plurality of the polarization setups of the polarization generator system and the polarization analyzer system could be employed. For each polarimetric setup, the moving mirror 211 could move across the total travel distance. Alternatively, the polarimetric measurements could also be taken at each position of the moving mirror 211, so that a sequence of interferogram with varying polarization setup of both the polarization generator system and the polarization analyzer system could be taken, before the mirror 211 moves to a different position.

Note that the beamsplitter in the imaging Fourier transform spectrometer system could also be a polarizing beamsplitter, so that polarizing interferometer configurations, such as a Martin-Puplett polarizing interferometer could be used.

Figure 13:
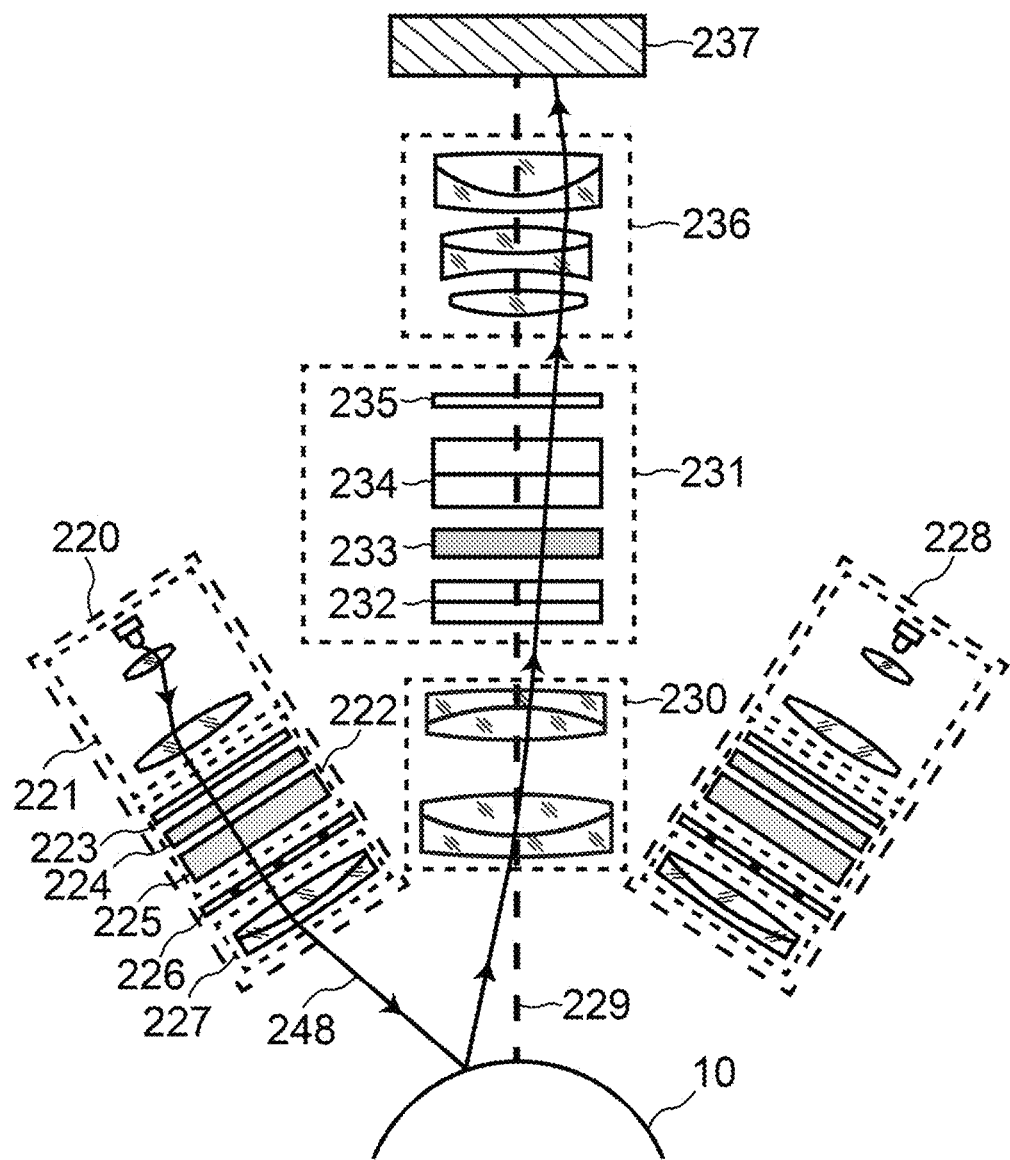
FIG. 13 presents Embodiment 11 of the device, which is a snapshot spectroellipsometric imaging system.

FIG. 13 presents another embodiment, Embodiment 11 of the disclosed device, which is a snapshot spectroellipsometric imaging system. An illuminator 220, comprises a light source 221, a polarization generator system 222, an optional registration pattern panel 226, and a beam shaping group 227. Preferably, the polarization generator system 222 comprises a linear polarizer 223, a first high-order retarder 224 and a second high-order retarder 225. Both high-order retarders are optically thick such that their phase retardance values vary considerably with wavelength 2. One embodiment of a high-order retarder is an optically thick calcite plate. Preferably, the transmission axis of the linear polarizer 223 and the fast axis of the second high-order retarder 225 are along the same direction, and the fast axes of 224 and 225 are at 45° to each other. The illuminator could further comprise an optional symmetric group 228, with 220 and 228 being symmetric with respect to the optical axis 229 of the system. Preferably, the illuminators could adjust both the polar angle and the azimuthal angle with respect to the system optical axis 229 with a rotatable arm to achieve a large range of incident angles. After reflection off a sample 10, light is collimated by an objective group 230, as illustrated by an exemplary ray 248. Note the beam shaping group 227 is chosen to match the shape of the sample under test, and a positive lens group 227 is used to match the convex surface in FIG. 13. The objective group 230 collimates light from each point in the object plane of the sample into a beam bundle along a certain direction. The collimated beam passes through a polarization analyzer system 231, which comprises a first Savart plate 232, an achromatic half-wave plate (AHWP) 233, a second Savart plate 234, and a linear analyzer 235. The two Savart plates 232 and 234 each consists of two equal thickness uniaxial crystal subplates such that the optic axes of both subplates are aligned at 45° to the surface normal and rotated 90° with respect to each other. The achromatic half-wave plate 233 could be made of a Fresnel rhomb or a polymer broadband half-wave plate. After the polarization analyzer system 231, light passes through a focusing group 236, and reaches a detection system 237. Elements 230-236 in total constitute the imaging system of this embodiment. The detection system could be a single broadband detector as shown in FIG. 13, or it could comprise a plurality of detectors, each sensitive to a different spectral region, and these detectors could be aligned with beamsplitters.

Similar to FIG. 13, other snapshot imaging spectrometer system could be employed, such as a computed tomography imaging spectrometer (CTIS), an image mapping spectrometer (IMS), etc. Combining snapshot spectrometer with disclosed polarimetric components, high throughput, fast spectroellipsometric imaging of a thin film sample could be achieved.

Note that most of the previously disclosed spectrometer systems are all used in the detection side. However, some of these spectrometer systems could be readily modified to be placed in the illumination side and function as a monochromator, similar to that in FIG. 11. These setups could also enable spectroellipsometric imaging of thin film samples.

The thin film analysis method disclosed in this invention is mainly based on three aspects: the spatial distribution, spectral reflectance and polarization properties. Joint analysis of both spectral and ellipsometric information in a certain spatial area by the disclosed spectroellipsometric imaging device provides a comprehensive characterization of thin films. Essential to this invention is a calibration process with at least one reference phantom, so that the spectroellipsometric characterization could be extended to thin films on a curved sample.

Generally, the more polarization states of the polarizer-analyzer pairs are required, the long the image capturing time will be. For a complete Mueller matrix characterization, a minimum 16 different polarization setup is usually required, although the required different polarization measurements could be reduced with a calibration process and a priori knowledge of a specific sample. For example, if a sample is non-depolarizing, Jones calculus (which has significantly fewer parameters than Mueller calculus) might be sufficient to characterize the sample without sacrificing accuracy, and fewer measurements and shorter measurement time are necessary. If only basic polarization characterization is necessary to evaluate certain samples, a simple setting of the polarizer-analyzer pairs with two linear polarizers of parallel or orthogonal polarization directions could be chosen.

Preferably, image registration is the first step of image analysis. For the special case of high precision alignment, with a static sample and at least one static reference phantom of the same geometrical shape, the optional registration pattern panel may not be necessary. However, for a general measurement, especially for a dynamic sample, such as the tear film on an eye, it's preferred to use the registration pattern panel or integrate the registration pattern as part of the polarization generator system or the polarization analyzer system. Image registration is the process to align and match the image series from the sample and the reference phantom based on reflected images of the registration pattern. Usually, the geometry of a reference phantom is substantially similar to the geometry of a sample, but may not be exactly the same. A geometric transformation of the images of at least one reference phantom to match the images of the sample based on images of a registration pattern panel could be employed in image processing. Alternatively, the image series of the sample could be transformed to match the images series of the reference phantom(s). Therefore, matched pixel pairs from the sample and the reference phantom correspond to substantially similar incident angles, which would be crucial to minimize instrument polarization errors. The simplest geometric transformation may be a stretch or a compression by a scaling factor calculated from the registration pattern images of the sample and the reference phantom.

Embodiment 3 illustrated in FIG. 4 is used as an example for the mathematical analysis. If all the optical elements are substantially non-depolarizing, Jones calculus could be employed for the mathematical analysis. The general form of Jones calculus exemplified by but not limited to FIG. 4 is:

$$E_{oq} = I_2 A_q I_1 \Phi_2 R \Phi_1 B G_q E_{inc}, \quad (1)$$

where $E_{inc} = [E_{inc,x}, E_{inc,y}]^T$ is the incident Jones vector of a chief ray incident onto the polarization generator system. $G_q$ is a 2×2 Jones matrix for the polarization generator system. The subscript "q" stands for the q-th polarimetric setup, where q=0, 1, . . . Q−1, and Q is the total number of different polarimetric setups. B is a 2×2 Jones matrix for the beam shaping group. $\Phi_1$ is a 2×2 rotation matrix that rotates the local input field components into the p and s polarization components of the point where the chief ray intersects on the sample. R is a 2×2 reflection matrix in the local p and s basis. $\Phi_2$ is a 2×2 rotation matrix that rotates the reflected electric field of the chief ray from the p and s basis of a point in the sample surface to the detector coordinate basis centered on the optical axis 42 in FIG. 4. $I_1$ is a 2×2 Jones matrix characterizing the polarization of the optics after sample reflection and before the polarization analyzer system. $A_q$ is a 2×2 Jones matrix for the polarization analyzer system in the q-th polarimetric setup. $I_2$ is a 2×2 Jones matrix characterizing the polarization of the optics after the polarization analyzer system. $E_{oq} = [E_{oq,x}, E_{oq,y}]^T$ is the output Jones vector on the detector in the q-th polarimetric setup. Note that a series of measurements are taken for a sample, and the polarization generator system and the polarization analyzer system setup are varied for each measurement, and $G_q$ and $A_q$ are the matrices for the q-th polarimetric setup. The rest of the Jones matrices in Eq. (1) are fixed for a sample in a fixed experimental layout.

In the disclosed methods, at least one reference phantom with known optical properties is used for calibration. Similarly, for the reference phantom $$E_{oq,0j} = I_2 A_q I_1 \Phi_2 R_{0j} \Phi_1 B G_q E_{inc}, \quad (2)$$

where $R_{0j}$ stands for the 2×2 Jones matrix of the j-th reference phantom, where j=1, 2, . . . J, if in total J reference phantoms are used. The subscript "0" stands for the reference phantom. Preferably, the reference phantom is a bare isotropic substrate or an isotropic substrate with isotropic thin films deposited on. The reference phantom has the same or substantially similar geometrical shape to the sample, and preferably, the irradiance reflectance off the reference phantom and the sample are close.

In general, the polarization generator system $G_q$ and the polarization analyzer system $A_q$ intentionally introduce polarization changes into the system, hence their Jones matrices tend to deviate significantly from the 2×2 identity matrix. On the other hand, the beam shaping group B, and the optics before and after the polarization analyzer system $I_1$ and $I_2$ usually only have small deviation from the 2×2 identity matrix. This type of matrices (B, $I_1$ and $I_2$) are generally representative of the instrumental polarization of the system, and they usually are caused by the birefringence of the optical components induced by stress from mechanical mounting or the non-normal incidence on the surfaces of these optical components.

Due to the calibration process, the instrumental polarization errors could be reduced since the sample and the reference phantom experience proportionally the same amount instrumental polarization. If after calibration, these reduced errors are within the tolerance limit, simplified equations $$E_{oq} = A_q \Phi_2 R \Phi_1 G_q E_{inc}, \quad (3)$$

and $$E_{oq,0j} = A_q \Phi_2 R_{0j} \Phi_1 G_q E_{inc}, \quad (4)$$

could be employed.

If the sample is isotropic, its Jones matrix in the local p and s basis is a diagonal matrix $$R = \begin{bmatrix} r_p e^{i\delta_p} & 0 \\ 0 & r_s e^{i\delta_s} \end{bmatrix} = r_s e^{i\delta_s} \begin{bmatrix} \tan\Psi e^{i\Delta} & 0 \\ 0 & 1 \end{bmatrix}, \quad (5)$$

where $\tan\Psi = r_p/r_s$ and $\Delta = \delta_p - \delta_s$.

In conventional ellipsometry, usually only the amplitude ratio $\tan\Psi$ and the phase difference $\Delta$ are of concern for ellipsometric calculations, and $\Psi$ and $\Delta$ are referred to as ellipsometric angles. Hence the constant factor of $r_s \exp(i\delta_s)$ on the right side of Eq. (5) is often dropped during calculation.

However, in the method disclosed in this invention, at least one reference phantom is used for calibration. Further, in the mathematical calculation, the equations for the reference phantom and those for the sample are not calculated independently, but rather the recorded irradiances from the sample and the reference phantom are directly compared. Because the electric field reflectivity $(r_p, r_s)$ of the sample and the reflectivity $(r_{p0j}, r_{s0j})$ of the j-th reference phantom generally have different values, $r_p$ and $r_s$ could not be simply represented by their ratio of $\tan\Psi$ in the disclosed method, i.e. the factor $r_s$ on the right side of Eq. (5) could not be dropped as in conventional ellipsometry. On the other hand, the common phase factor $\exp(i\delta_s)$ on the right side of Eq. (5) still can be dropped in the disclosed method, since the detector cannot directly measure the absolute phase of a beam unless some interferometric setups are employed.

In other words, in conventional ellipsometry, $\Psi$ and $\Delta$ are the two key parameters to calculate. In the disclosed ellipsometry method with reference phantom calibration, $r_p$, $r_s$ and $\Delta$, all three parameters have to be taken into consideration, even though their explicit values may not necessarily have to be directly calculated.

Given all these considerations, it's more appropriate to write the Jones matrix of an isotropic sample in the local p and s basis as $$R = \begin{bmatrix} r_p e^{i\Delta} & 0 \\ 0 & r_s \end{bmatrix}, \quad (6)$$

For the j-th isotropic reference phantom, the Jones matrix in its local p and s basis is $$R_{0j} = \begin{bmatrix} r_{p0j} e^{i\Delta_{0j}} & 0 \\ 0 & r_{s0j} \end{bmatrix}. \quad (7)$$

With the q-th polarimetric measurement setup, the Jones vector of light after the polarization generator system is denoted as $$E_{iq} = G_q E_{inc} = [E_{iq,x}, E_{iq,y}]^T \quad (8)$$

From Eq. (3), the output Jones vector is $$E_{oq} = A_q E_{osq} = \quad (9)$$

$$A_q \begin{bmatrix} \cos\theta_2 & \sin\theta_2 \\ -\sin\theta_2 & \cos\theta_2 \end{bmatrix} \begin{bmatrix} r_p e^{i\Delta} & 0 \\ 0 & r_s \end{bmatrix} \begin{bmatrix} \cos\theta_1 & \sin\theta_1 \\ -\sin\theta_1 & \cos\theta_1 \end{bmatrix} \begin{bmatrix} E_{iq,x} \\ E_{iq,y} \end{bmatrix},$$

where $E_{osq}$ stands for the output Jones vector after sample and before the polarization analyzer system. From matrix multiplication, $$E_{osq,x} = r_p e^{i\Delta}(E_{iq,x}\cos\theta_1 + E_{iq,y}\sin\theta_1)\cos\theta_2 + r_s(-E_{iq,x}\sin\theta_1 + E_{iq,y}\cos\theta_1)\sin\theta_2, \quad (10)$$

$$E_{osq,y} = -r_p e^{i\Delta}(E_{iq,x}\cos\theta_1 + E_{iq,y}\sin\theta_1)\sin\theta_2 + r_s(-E_{iq,x}\sin\theta_1 + E_{iq,y}\cos\theta_1)\cos\theta_2. \quad (11)$$

Hence, $$E_{oq} = A_q \begin{bmatrix} r_p e^{i\Delta} A + r_s B \\ r_p e^{i\Delta} C + r_s D \end{bmatrix}, \quad (12)$$

where $$A = (E_{iq,x}\cos\theta_1 + E_{iq,y}\sin\theta_1)\cos\theta_2,$$

$$B = (-E_{iq,x}\sin\theta_1 + E_{iq,y}\cos\theta_1)\sin\theta_2,$$

$$C = -(E_{i_q,x} \cos\theta_1 + E_{i_q,y} \sin\theta_1)\sin\theta_2,$$

$$D = (-E_{i_q,x} \sin\theta_1 + E_{i_q,y} \cos\theta_1)\cos\theta_2. \quad (13)$$

The parameters A, B, C, and D in Eq. (13) are the same or substantially similar for both the sample and the reference phantom for a certain polarization generator system. For the j-th reference phantom $$E_{oq,0j} = A_q \begin{bmatrix} r_{p0j} e^{i\Delta_{0j}} A + r_{s0j} B \\ r_{p0j} e^{i\Delta_{0j}} C + r_{s0j} D \end{bmatrix} \quad (14)$$

Since the polarization generator system and the polarization analyzer system are directly controlled during the q-th polarimetric measurement, the fields $E_{i_q,x}$ and $E_{i_q,y}$ and the analyzer matrix $A_q$ are known. Hence, A, B, C, and D four parameters could be determined by two unknowns $\theta_1$ and $\theta_2$.

The digital number ($DN_q$) at each pixel on the detector in the q-th polarimetric setup is proportional to the irradiance incident upon it $$DN_q = cI_{oq} = cE_{oq}^\dagger E_{oq}, \quad (15)$$

where c is a constant proportionality factor, $I_{oq}$ is the modulus of the output electric field for the q-th polarimetric setup, and $E_{oq}^\dagger$ is the Hermitian conjugate of the output Jones vector $E_{oq}$. Preferably, the digital numbers used in the analysis have already be compensated with flat-field correction. The linearity in Eq. (15) is valid as long as that light incident on the detector plane is neither too dim, so that it's below the noise level of the detector, nor is the light too bright, so that the detector pixels are saturated. Other than these two extreme cases, a linear response of the detector pixel digital number with the incident irradiance is usually valid. This constant proportionality factor c could be calculated for each pixel to take into account of detector spatial variability. Also, note that if analog detectors are used, analog to digital conversion could be done to apply the disclosed analysis methods based on digital numbers.

Theoretically, the constant proportionality factor c should be the same for a specific detector pixel, independent of the geometric or polarimetric setup of the system. However, in the simplification from Eq. (1) to Eq. (3), instrumental polarization errors have been assumed to be negligible. To take these instrumental polarization errors at a specific polarimetric setup into account, preferably, the constant proportionality factor c should be assumed to be dependent on the specific polarimetric setup of the system. Experimentally, a setup-dependent constant proportionality factor $c_q$ tends to lead to more robust calculation results, which is used in the calibration process of the disclosed methods. Hence Eq. (15) should be modified as $$DN_q = c_q I_{oq} = c_q E_{oq}^\dagger E_{oq}. \quad (16)$$

In the disclosed methods, the constant proportionality factor $c_q$ for the q-th polarimetric setup could be directly calculated from the reference phantom. Alternatively, directly ratios of the digital number of the sample $DN_q$ and that of the reference phantom $DN_{q0j}$ could be taken so that the constant proportionality factor $c_q$ is cancelled during the calculation.

The polarization generator system and the polarization analyzer system are controlled in the q-th polarimetric setup, hence $G_q$, $A_q$, and correspondingly $E_{iq}$ are known. If the instrumental polarization errors are negligible, the unknowns are $r_p$, $r_s$, and $\Delta$ of the sample, and $\theta_1$ and $\theta_2$ of the system geometry. $\theta_1$ and $\theta_2$ are fixed values for a fixed system geometry and generally have different values for different pixels in a sample image (especially if the sample surface is curved), i.e. both $\theta_1$ and $\theta_2$ are spatially dependent, and have to be calibrated.

The coordinates rotation angles $\theta 1$ and $\theta_2$ are independent of the sample or the reference phantom, as long as the system geometry remains the same or substantially similar. For a sample $$DN_q = DN_q(r_p, r_s, \Delta, \theta_1, \theta_2, c_q) = c_q I_{oq}(r_p, r_s, \Delta, \theta_1, \theta_2), \quad (17)$$

For a reference phantom, assuming only a single reference phantom is used, $$DN_{q0} = DN_{q0}(r_{p0}, r_{s0}, \Delta_0, \theta_1, \theta_2, c_q) = c_q I_{oq,0}(r_{p0}, r_{s0}, \Delta_0, \theta_1, \theta_2). \quad (18)$$

With $r_{p0}$, $r_{s0}$, and $\Delta_0$ known for the reference phantom, the ratio of the digital numbers of the sample and the reference phantom under the same q-th polarimetric setup $$R_{DN} = \frac{DN_q}{DN_{q0}} = \frac{I_{oq}(r_p, r_s, \Delta, \theta_1, \theta_2)}{I_{oq,0}(r_{p0}, r_{s0}, \Delta_0, \theta_1, \theta_2)} = R_{DN}(r_p, r_s, \Delta, \theta_1, \theta_2) \quad (19)$$

Note the $R_{DN}$ is dependent on $r_p$, $r_s$, $\Delta$, $\theta_1$ and $\theta_2$ five unknowns. In general, $r_p$, $r_s$, $\Delta$, $\theta_1$ and $\theta_2$ five unknowns demand at least five independent equations to form an equation set to solve. Theoretically, these five equations could be obtained from five independent polarimetric setups by adjusting the polarization generator system and the polarization analyzer system. Experimentally, usually, more than five polarimetric or ellipsometric measurements are taken for both the sample and the reference phantom, and the redundant information could be used for a least-square best fit method to optimize the final evaluation of $r_p$, $r_s$, $\Delta$, $\theta_1$ and $\theta_2$ five unknowns. Specifically, from the three parameters of $r_p$, $r_s$, and $\Delta$, the optical properties of the sample could be characterized. In this method, at least ten measurements (five for the sample and five for the reference phantom) have to be made.

In some cases, the optical surface on which a thin film is deposited might have a depolarizing element behind it, and both the reflection from the front optical surface and the scattering from the depolarizing element need to be taken into account. The embodiments of the depolarizing element include but are not limited to a roughened aluminum plate, a piece of paper, or a mammalian iris.

If a completely depolarizing element is behind the front optical surface with the thin film, (as in a first-order approximation of a completely depolarizing iris, which is behind the ocular surface), mutual subtraction of the digital numbers from the sample in different polarimetric setups could significantly minimize the effect of backscattered depolarized light. With the operation of mutual subtraction, if there are Q different polarimetric setups, an equation set of Q−1 equations could be formed. In order to solve $r_p$, $r_s$, $\Delta$, $\theta_1$ and $\theta_2$ five unknowns, at least six independent polarimetric or ellipsometric measurements (Q≥6) need to be taken for both the sample and the reference phantom. For a sample, $$\frac{DN_m - DN_n}{c_{mn}} = I_{om} - I_{on}, \quad (20)$$

where subscripts "m" and "n" stand for the m-th and n-th polarimetric setup, respectively, and 0≤m≤Q−1, 0≤n≤Q−1. $c_{mn}$ is the constant proportionality factor for the mutual subtraction. Similarly, for a reference phantom, $$\frac{DN_{m0} - DN_{n0}}{c_{mn}} = I_{om,0} - I_{on,0} \quad (21)$$

The ratio of the digital numbers of the sample and the reference phantom after mutual subtraction is $$R_{DN,mn} = \frac{DN_m - DN_n}{DN_{m0} - DN_{n0}} = \frac{I_{om} - I_{on}}{I_{om,0} - I_{on,0}} = R_{DN,mn}(r_p, r_s, \Delta, \theta_1, \theta_2) \quad (22)$$

With at least five equations of mutual subtraction in the form of Eq. (22) from at least six polarimetric setups, the five unknowns $r_p$, $r_s$, $\Delta$, $\theta_1$ and $\theta_2$ are determined from the equation set. The optical properties of the sample, such as refractive index and thickness values could be directly retrieved from $r_p$, $r_s$, and $\Delta$ parameters with a least square best-fit algorithm or a maximum likelihood estimation method. In this method, at least 12 measurements (six for the sample and six for the reference phantom) have to be made.

In the specific case of human tear film evaluation for dry eye syndrome diagnosis, the tear film on top of the cornea could be generally decomposed into the anterior lipid layer (usually 0-500 nm), the middle aqueous layer (usually 1-3 µm) and the innermost mucous layer (usually less than 1 µm and doesn't have a sharp optical transition with the aqueous layer). For lipid layer evaluation, sometimes, the underneath aqueous layer and the mucous layer together could be treated as an optically thick substrate. However, the human iris background noise is usually a limiting factor for tear film lipid layer thickness measurement methods described in the prior art. The human iris functions as a partially depolarizing element because of the physiological structure of the iris. The effect of the iris reflected light could be minimized by mutual subtraction of detected irradiance values of the same point on the ocular surface under different polarimetric setups of the polarizer-analyzer pairs. However, the method of mutual subtraction to remove background noise is mostly effective only to the completely depolarized portion of the iris scattered light. The non-depolarizing portion of the iris reflected light will go through the cornea twice, hence corneal birefringence will have a direct effect on the polarization change of that portion of the iris reflected light. Corneal birefringence could be measured with a retinal polarimeter. The Henle's fiber layer of the fovea has a radial nerve fiber distribution, which could be used as a natural internal polarimeter of the human eye to measure the corneal birefringence. In a first-order approximation, a completely depolarizing iris could be assumed, which is mathematically analyzed herein. For a complete analysis of the partially polarizing effect of the human iris, the corneal birefringence data of the subject has to be incorporated, and those skilled in the art could readily extend the analysis methods described herein to take corneal birefringence into account.

In the above disclosed methods, whether the five parameters $r_p$, $r_s$, $\Delta$, $\theta_1$ and $\theta_2$ are calculated with ratios of digital numbers or ratios of mutual subtraction of digital numbers, the optical properties of a sample are retrieved with the help of a single reference phantom. The reference phantom acts as a bridge to link the reflected irradiances on the detector from the sample and the reference phantom through the shared constant proportionality factor $c_q$. This type of methods is hereinafter referred to as the "single-reference method".

Note in some applications, only rudimentary estimation of the thin films within a limited region is required. The geometric setup of the limited region could be chosen such that the rotational angles $\theta_1$ and $\theta_2$ are both small (for example, $-10°<\theta_1<10°$, $-10°<\theta_2<10°$, and even the coordinates rotation matrices $\Phi_1$ and $\Phi_2$ in Eq. (3) and Eq. (4) could be further dropped. This simplification will also contribute to the instrumental polarization errors, which could be minimized by the use of polarimetric setup-dependent constant proportionality factors [$c_q$ in Eq. (17) or $c_m$ in Eq. (20)], which are calibrated with a reference phantom. By further dropping of two unknowns $\theta_1$ and $\theta_2$, the unknown parameters have been reduced to three: $r_p$, $r_s$, and $\Delta$. Correspondingly, at least three polarimetric setups, and at least six measurements (three for the sample and three for the reference phantom) are required in the single-reference method. If mutual subtraction is necessary, at least four polarimetric setups and at least eight measurements are needed in the single-reference method.

Alternatively, a plurality of reference phantoms could be used. This type of methods is hereinafter referred to as the "multiple-reference method". For example, if J reference phantoms are used, and for the j-th reference phantom ($1 \leq j \leq J$), $$DN_{q0j} = DN_{q0j}(r_{p0j}, r_{s0j}, \Delta_{0j}, \theta_1, \theta_2, c_q) = c_q I_{oq,oj}(r_{p0j}, r_{s0j}, \Delta_{0j}, \theta_1, \theta_2). \quad (23)$$

For a certain geometric and polarimetric setup, the constant proportionality factor $c_q$ and the coordinates rotation angles $\theta_1$ and $\theta_2$ stay the same. Direct ratios of the digital number of the i-th reference phantom $DN_{q0i}$ ($1 \leq i \leq J$, $i \neq j$) and that of the j-th reference phantom $DN_{q0j}$ could be taken to cancel $c_q$, and $$R_{DN,0ij} = \frac{DN_{q0i}}{DN_{q0j}} = \frac{I_{oq,0i}(r_{p0}, r_{s0}, \Delta_0, \theta_1, \theta_2)}{I_{oq,0j}(r_{p0}, r_{s0}, \Delta_0, \theta_1, \theta_2)} = R_{DN,0ij}(\theta_1, \theta_2) \quad (24)$$

If three independent reference phantoms are used, and two direct ratios of the form in Eq. (24) are obtained, the two coordinates rotation angles $\theta_1$ and $\theta_2$ could be calculated with three reference phantoms. The retrieved $\theta_1$ and $\theta_2$ values could be substituted in Eq. (19), which now only have parameters $r_p$, $r_s$, and $\Delta$ three unknowns, hence at least three polarimetric setups have to be used to form an equation set. In this method, at least 12 measurements (three for the sample and three for each of the three reference phantoms) have to be made.

In the case of an optical surface with a depolarizing element behind it, mutual subtraction of digital numbers could be used. The two rotational angles $\theta_1$ and $\theta_2$ could be calculated with reference phantoms only, if four independent reference phantoms are used.

$$R_{DN,0ijl} = \frac{DN_{q0i} - DN_{q0j}}{DN_{q0i} - DN_{q0l}} = \frac{I_{oq,0i} - I_{oq,0j}}{I_{oq,0i} - I_{oq,0l}} = R_{DN,0ijl}(\theta_1, \theta_2), \quad (25)$$

where subscripts i, j, and l stand for three different reference phantoms in the same q-th polarimetric setup. After $\theta_1$ and $\theta_2$ values are retrieved from four reference phantoms, only parameters $r_p$, $r_s$, and $\Delta$ three unknowns are left, hence at least three polarimetric setups have to be used to form an equation set. In this method, at least 15 measurements (three for the sample and three for each of the four reference phantoms) have to be made.

In the disclosed methods so far, the three parameters $r_p$, $r_s$, and $\Delta$, which characterizes the optical properties of a sample are directly calculated. However, $r_p$, $r_s$, and $\Delta$ three parameters are not completely independent of each other. For example, for a non-absorbing thin film layer on a substrate with known refractive index, the thin film refractive index n and the thickness d two parameters are enough to determine $r_p$, $r_s$, and $\Delta$ three unknowns, if the incident angle $\varphi_0$ is known. If an air-thin film-substrate three-layer structure is used as an example, the electric field reflectivity coefficients of the air-thin film interface based on Fresnel equations are $$r_1^p = \frac{n_1 \cos\varphi_0 - n_0 \cos\varphi_1}{n_1 \cos\varphi_0 + n_0 \cos\varphi_1}, r_1^s = \frac{n_0 \cos\varphi_0 - n_1 \cos\varphi_1}{n_0 \cos\varphi_0 + n_1 \cos\varphi_1} \quad (26)$$

where $n_0$, $n_1$ are the refractive indices of air ($n_0$=1) and the thin film, $\varphi_0$, $\varphi_1$ are the incident angles in the air and in the thin film, respectively, and p-polarization is parallel to the local plane of incidence, and s-polarization is perpendicular to the local plane of incidence.

Similarly, the electric field reflectivity coefficients of the thin film-substrate interface are $$r_2^p = \frac{n_2 \cos\varphi_1 - n_1 \cos\varphi_2}{n_2 \cos\varphi_1 + n_1 \cos\varphi_2}, r_2^s = \frac{n_1 \cos\varphi_1 - n_2 \cos\varphi_2}{n_1 \cos\varphi_1 + n_2 \cos\varphi_2}, \quad (27)$$

where $n_2$ and $\varphi_2$ correspond to the substrate.

The chief ray incident angle $\varphi_0$ for a pixel in the detector is usually calculated directly from the system geometry, and $\varphi_1$ and $\varphi_2$ are derived from Snell's law. Preferably, the registration pattern panel images are used to ensure consistency of the incident angles for the sample and the reference phantom.

Taking multiple reflections into account, the total reflectivity coefficients are $$R_p = \frac{r_1^p + r_2^p e^{-i2\beta}}{1 + r_1^p r_2^p e^{-i2\beta}}, R_s = \frac{r_1^s + r_2^s e^{-i2\beta}}{1 + r_1^s r_2^s e^{-i2\beta}}, \quad (28)$$

where $\beta$ is the effective phase thickness $$\beta = \frac{2\pi d n_1}{\lambda} \cos\varphi_1. \quad (29)$$

Eqs. (26-29) are for a single layer thin film. For multilayer thin film coating structures, the total reflectivity coefficients could be calculated with the Rouard's method, which uses the above formula recursively starting from the bottom of the thin film coating stack, and treats the already analyzed part as a new substrate.

For a fixed geometric setup, the incident angle $\varphi_0$ could be calculated by geometrical ray-tracing, independent of the polarimetric setup. Therefore, to extract the optical parameters of the thin film coating, for example, if there are k unknown parameters $(x_1, x_2, \ldots, x_k)$, $k \leq Q$, where these unknown optical parameters could be but are not limited to thicknesses or refractive indices of some sublayers in the thin film coating, and Q is the total number of different polarimetric setups. Preferably, the previously described two coordinates rotation angles $\theta_1$ and $\theta_2$ could be included as part of the parameter set $(x_1, x_2, \ldots, x_k)$. A properly chosen search range for unknown optical parameters of the sample could be selected, so that $x_1 \in [x_{11}, x_{12}]$, $x_2 \in [x_{21}, x_{22}]$, ..., $x_k \in [x_{k1}, x_{k2}]$. A lookup table could be created, which contains the corresponding ratios of the digital numbers of the sample and at least one reference phantom under the same polarimetric setups for all possible combinations of the unknown optical parameters in the chosen search range.

The experimentally measured ratios of the digital numbers of the sample and the reference phantom, as in Eq. (19), of each spectral channel of the detector could be compared with this lookup table of ratios of the digital numbers, and a set of optical parameters $(x_1, x_2, \ldots, x_k) = (x_{10}, x_{20}, \ldots, x_{k0})$ could be located, which generates the least discrepancy in all the lookup table data with the experimental data. These unknown parameters are therefore retrieved.

For samples with a depolarizing element behind it, mutual subtraction of digital numbers could be used. The lookup table calculates the ratios of the mutual subtraction of digital numbers of the sample and the reference phantom, as in Eq. (22), of all possible combinations of these unknown parameters for each spectral channel of the detector. Up to Q−1 unknown parameters could be retrieved due to the mutual subtraction. A subsequent comparison of the experimentally measured ratios of the mutual subtraction of digital numbers with this lookup table will locate a set of optical parameters $(x_1, x_2, \ldots, x_k) = (x_{10}, x_{20}, \ldots, x_{k0})$, that generates the least discrepancy in all the mutual subtraction of digital numbers with the experimental data. These unknown parameters are therefore retrieved.

Note in this method, no direct calculation of the three parameters $r_p$, $r_s$, and $\Delta$ is necessary. All optical parameters are evaluated at the level of digital numbers directly, by the ratios of digital numbers or the ratios of mutually subtracted digital numbers. This type of methods could be referred to as the "lookup table method".

With the lookup table method, if the coordinates rotation angles $\theta_1$ and $\theta_2$ are both small, the coordinates rotation matrices $\varphi_1$ and $\varphi_2$ could be further dropped. Correspondingly, the required polarimetric setups are reduced. For example, if a single thin film layer with unknown real refractive index n and thickness d is deposited on a known substrate, only two unknowns (n and d) need to be modeled in the lookup table, hence only two polarimetric setups and four measurements are needed in total (two for the sample and two for the reference phantom). If mutual subtraction is necessary, only three polarimetric setups and six measurements (three for the sample and three for the reference phantom) are necessary.

Note that the sample is assumed to be isotropic in the above disclosed analysis methods, whose Jones matrix is a diagonal matrix as in Eq. (5) or Eq. (6). If the sample is anisotropic, i.e. if the substrate or any of the thin film layers is anisotropic, the Jones matrix in the local p and s basis is a non-diagonal matrix $$R = \begin{bmatrix} r_{pp} & r_{ps} \\ r_{sp} & r_{ss} \end{bmatrix} \quad (30)$$

The anisotropy might be caused by birefringence or dichroism, or the anisotropy could rise from the structure of the optical surface under measurement, such as a nanometer-scale grating. Each element in the complex-amplitude reflection matrix Eq. (30) could be a complex number with both real and imaginary parts two unknowns (eight real parameters in total). Even after dropping a constant phase factor, seven parameters are still unknown. However, these four complex-amplitude reflection parameters $r_{pp}$, $r_{ss}$, $r_{ps}$, and $r_{sp}$ are not independent, and based on the birefringence or dichroism properties of the sample materials, usually some simplification could be made in the analysis, even though generally more polarimetric setups have to be employed to solve Eq. (30) with an anisotropic sample.

The interdependence of $r_{pp}$, $r_{ss}$, $r_{ps}$, and $r_{sp}$, and their ultimate dependence on the optical properties of the thin films and geometry of system setups indicate that a "lookup table method" similar to that used for an isotropic sample could still be used, albeit with more parameters in the analysis.

All the disclosed ellipsometry methods could be analyzed for each individual spectral channel. The entire spectroellipsometric properties of the sample could be obtained when the procedure is done for all the spectral channels in the detector. In the case of hyperspectral detectors, each spectral channel is usually narrow enough to be treated as a quasi-monochromatic channel. In the case of a multispectral detector, for each spectral channel, the weighted average of the multiplication of the illuminator spectrum and the detector response spectrum could be calculated, and an average wavelength is obtained. Multiple average wavelengths could be used for a rough spectral characterization of the sample.

However, for ellipsometric systems that integrate multispectral or hyperspectral imaging, system geometric parameters, such as the incident angle of a chief ray corresponding to a pixel at the detector, and the coordinates rotation angles $\theta_1$ and $\theta_2$, are independent of the variation of spectral channels. Therefore, the measurements from different spectral channels under a certain geometric and polarimetric setup could be directly compared, and the necessary measurements could be significantly reduced. Further, the multispectral or hyperspectral imaging capability may generate some redundant data, and least-square best fit or maximum likelihood estimation could be used for evaluation of some shared parameters.

Using an isotropic sample as an example, in order to take different spectral response into account, it's more appropriate to add spectral dependence to previously disclosed equations. Eqs. (17-18) could be modified, and for a sample, $$DN_{q\lambda} = c_{q\lambda} I_{oq,\lambda}(r_{p\lambda}, r_{s\lambda}, \Delta_\lambda, \theta_1, \theta_2) \quad (31)$$

For a reference phantom, assuming only a single reference phantom is used, $$DN_{q0\lambda} = c_{q\lambda} I_{oq,0\lambda}(r_{p0\lambda}, r_{s0\lambda}, \Delta_{0\lambda}, \theta_1, \theta_2). \quad (32)$$

Note that for different wavelengths $\lambda$, the constant proportionality factors $c_{q\lambda}$ are different, since different spectral pixel response could be different. Eq. (19) becomes $$R_{DN,\lambda} = \frac{DN_{q\lambda}}{DN_{q0\lambda}} = \frac{I_{oq,\lambda}(r_{p\lambda}, r_{s\lambda}, \Delta_\lambda, \theta_1, \theta_2)}{I_{oq,0\lambda}(r_{p0\lambda}, r_{s0\lambda}, \Delta_{0\lambda}, \theta_1, \theta_2)} = R_{DN,\lambda}(r_{p\lambda}, r_{s\lambda}, \Delta_\lambda, \theta_1, \theta_2) \quad (33)$$

Note that $\theta_1$ and $\theta_2$ are geometric parameters independent of wavelength $\lambda$, and $r_{p0\lambda}$, $r_{s0\lambda}$, $\Delta_{0\lambda}$ are known for the reference phantom.

As previously disclosed, if each spectral channel is analyzed independently, at least five different polarimetric set-ups are needed to form at least five equations of $R_{DN}$ in the form of Eq. (19). If two spectral channels are analyzed together, with $R_{DN,\lambda 1}(r_{p\lambda 1}, r_{s\lambda 1}, \Delta_{\lambda 1}, \theta_1, \theta_2)$ and $R_{DN,\lambda 2}(r_{p\lambda 2}, r_{s\lambda 2}, \Delta_{\lambda 2}, \theta_1, \theta_2)$ in the form of Eq. (33), in total, there are $r_{p\lambda 1}$, $r_{s\lambda 1}$, $\Delta_{\lambda 1}$, $r_{p\lambda 2}$, $r_{s\lambda 2}$, $\Delta_{\lambda 2}$, $\theta^1$, and $\theta_2$ eight unknowns. Hence, at least four polarimetric setups are necessary with a single-reference method, and each setup has $R_{DN,\lambda 1}$ and $R_{DN,\lambda 2}$ two equations and at least eight equations are obtained, enough to solve for these eight unknowns.

In general, if F (F≥2) spectral channels are used together for analysis, with $R_{DN,\lambda 1}(r_{p\lambda 1}, r_{s\lambda 1}, \Delta_{\lambda 1}, \theta_1, \theta_2)$ to $R_{DN,\lambda F}(r_{p\lambda F}, r_{s\lambda F}, \Delta_{\lambda F}, \theta_1, \theta_2)$ in the form of Eq. (33), in total, there are $r_{p\lambda 1}$, $r_{s\lambda 1}$, $\Delta_{\lambda 1}$, $r_{p\lambda 2}$, $r_{s\lambda 2}$, $\Delta_{\lambda 2}$, ..., $r_{p\lambda F}$, $r_{s\lambda F}$, $\Delta_{\lambda F}$, $\theta_1$, and $\theta_2$ 3F+2 unknown parameters. Therefore, at least four polarimetric setups are necessary with a single-reference method, and 4F equations are enough to solve for 3F+2 unknown parameters. In this case, at least eight measurements (four for the sample and four for the reference phantom) are necessary.

If there is a depolarizing element behind the front optical surface with the thin film layers, mutual subtraction of the digital numbers could be employed. After adding spectral dependence, Eq. (22) is modified into $$R_{DN,mn,\lambda} = \frac{DN_{m\lambda} - DN_{n\lambda}}{DN_{m0\lambda} - DN_{n0\lambda}} = R_{DN,mn,\lambda}(r_{p\lambda}, r_{s\lambda}, \Delta_\lambda, \theta_1, \theta_2) \quad (34)$$

If two spectral channels are analyzed together, with $R_{DN,mn,\lambda 1}(r_{p\lambda 1}, r_{s\lambda 1}, \Delta_{\lambda 1}, \theta_1, \theta_2)$ and $R_{DN,mn,\lambda 2}(r_{p\lambda 2}, r_{s\lambda 2}, \Delta_{\lambda 2}, \theta_1, \theta_2)$ in the form of Eq. (34), in total, there are $r_{p\lambda 1}$, $r_{s\lambda 1}$, $\Delta_{\lambda 1}$, $r_{p\lambda 2}$, $r_{s\lambda 2}$, $\Delta_{\lambda 2}$, $\theta_1$, and $\theta_2$ eight unknowns. Hence, at least five polarimetric setups are necessary to form at least four independent polarimetric setup pairs for mutual subtraction of digital numbers with a single-reference method. Each independent polarimetric setup pair corresponds to $R_{DN,mn,\lambda 1}$ and $R_{DN,mn,\lambda 2}$ two equations and at least eight equations are obtained, enough to solve for these eight unknowns.

In general, if F (F≥2) spectral channels are used together for analysis, with $R_{DN,mn,\lambda 1}(r_{p\lambda 1}, r_{s\lambda 1}, \Delta_{\lambda 1}, \theta_1, \theta_2)$ to $R_{DN,mn,\lambda F}(r_{p\lambda F}, r_{s\lambda F}, \Delta_{\lambda F}, \theta_1, \theta_2)$ in the form of Eq. (34), there are $r_{p\lambda 1}$, $r_{s\lambda 1}$, $\Delta_{\lambda 1}$, $r_{p\lambda 2}$, $r_{s\lambda 2}$, $\Delta_{\lambda 2}$, ..., $r_{p\lambda F}$, $r_{s\lambda F}$, $\Delta_{\lambda F}$, $\theta_1$, and $\theta_2$, in total, 3F+2 unknown parameters, and at least five polarimetric setups are necessary to form at least four independent polarimetric setup pairs for mutual subtraction of digital numbers with a single-reference method. Each independent polarimetric setup pair corresponds to F equations of $R_{DN,mn,\lambda 1}$ to $R_{DN,mn,\lambda F}$, and at least 4F equations are obtained, enough to solve for these 3F+2 unknowns. In this case, at least ten measurements (five for the sample and five for the reference phantom) are necessary.

Note in the above spectral analysis of Eqs. (31-34), it's preferred to choose wavelengths $\lambda_1, \lambda_2, \ldots, \lambda_F$, which are somewhat separated in the spectral range, especially for hyperspectral imaging analysis. This is because usually the sample and the reference phantom have a relatively smooth spectral reflectance dependence, i.e. the parameters $r_{p\lambda}$, $r_{s\lambda}$, and $\Delta_\lambda$ change relatively smoothly with wavelength for both the sample and the reference phantom. Hence, for two adjacent spectral channels $\lambda_1$ and $\lambda_2$ in a hyperspectral imaging system, i.e. $\lambda_1 \approx \lambda_2$, $R_{DN,\lambda 1}$ and $R_{DN,\lambda 2}$ (or $R_{DN,mn,\lambda 1}$ and $R_{DN,mn,\lambda 2}$) tend to be very close for both the sample and the reference phantom, which might lead to singularity for the obtained equation set, and create unnecessary mathematical difficulties for parameter retrieval. On the other hand, for adjacent spectral channels in a hyperspectral imaging system, sometimes, it's preferred to apply a weighted spectral averaging algorithm to the digital numbers to minimize the spectral channel noise.

The above analysis of Eqs. (31-34) are for an isotropic sample. For an anisotropic sample, more parameters have to be retrieved and more polarimetric setups are necessary. However, the general trend that analysis with different spectral channels together could significantly reduce the required polarimetric setups and the required independent measurements remains true.

Sometimes, Mueller calculus might be used for ellipsometric analysis. Mueller calculus is necessary when a depolarizing optical surface is under measurement, and Jones calculus is no longer valid. For example, the substrate where the thin film layers are coated on might have some nanostructures that are depolarizing, or there are some elements behind the front non-depolarizing surface which are depolarizing, such as the case of a depolarizing iris behind the cornea and tear film in a human eye.

Note that although the mathematical description in this disclosure is derived from the setup in FIG. 4, those skilled in the art could readily extend the mathematical description to all the other embodiments disclosed in this invention.

Similar in element sequence to Eq. (1) of Jones calculus, the general form of Mueller calculus exemplified by but not limited to FIG. 4 is:

$$S_{oq} = I_{M2} A_{Mq} I_{M1} \Phi_{M2} R_M \Phi_{M1} B_M G_{Mq} S_{inc}, \tag{35}$$

where $S_{inc}$ is the incident Stokes vector of a chief ray incident onto the polarization generator system. $G_{Mq}$ is a 4×4 Mueller matrix for the polarization generator system. The subscript "M" stands for a Mueller matrix, and "q" stands for the q-th polarimetric setup. $B_M$ is a 4×4 Mueller matrix for the beam shaping group. $\Phi_{M1}$ is a 4×4 rotation matrix that rotates the local input Cartesian coordinates into the p and s polarization coordinates of the point where the chief ray intersects on the sample. $R_M$ is a 4×4 reflection Mueller matrix in the local p and s coordinate basis. $\Phi_{M2}$ is a 4×4 rotation matrix that rotates the Stokes vector of the reflected chief ray from the p and s coordinate basis of a point on the sample surface to the detector coordinate basis centered on the optical axis 42 in FIG. 4. $I_{M1}$ is a 4×4 Mueller matrix characterizing the polarization of the optics after sample reflection and before the polarization analyzer system. $A_{Mq}$ is a 4×4 Mueller matrix for the polarization analyzer system in the q-th polarimetric setup. $I_{M2}$ is a 4×4 Mueller matrix characterizing the polarization of the optics after the polarization analyzer system. $S_{oq}$ is the output Stokes vector on the detector. Note that a series of measurements are taken for a sample, and the polarization generator system and the polarization analyzer system setup are varied, and $G_{Mq}$ and $A_{Mq}$ are the matrices for the q-th polarimetric setup. The rest of the Mueller matrices in Eq. (35) are fixed for a sample in a fixed experimental layout.

Similarly, for the j-th ($1 \leq j \leq J$) reference phantom $$S_{oq,0j} = I_{M2} A_{Mq} I_{M1} \Phi_{M2} R_{M,0j} \Phi_{M1} B_M G_{Mq} S_{inc}, \tag{36}$$

where $R_{M,0j}$ stands for the Mueller matrix of the j-th reference phantom. As described before, in some methods, a single reference phantom is enough for system calibration, though multiple reference phantoms could also be used. Preferably, the reference phantom is isotropic with the same or substantially similar geometrical shape to the sample, and preferably, the irradiance reflectance off the reference phantom and the sample are close.

Analogous to the methods with Jones calculus, the deviation of some matrices ($B_M$, $I_{M1}$ and $I_{M2}$) from a 4×4 identity matrix could be considered as instrumental polarization errors. Due to the calibration process, the instrumental polarization errors could be reduced since the sample and the reference phantom experience proportionally the same amount instrumental polarization errors. If after calibration, these reduced errors are within the tolerance limit, simplified equations for a sample $$S_{oq} = A_{Mq} \Phi_{M2} R_M \Phi_{M1} G_{Mq} S_{inc}, \tag{37}$$

and for the j-th reference phantom $$S_{oq,0j} = A_{Mq} \Phi_{M2} R_{M,0j} \Phi_{M1} G_{Mq} S_{inc}, \tag{38}$$

could be employed.

If the sample is isotropic, its Mueller matrix in the local p and s basis is $$R_M = \frac{1}{2} \begin{bmatrix} \tan^2\Psi + 1 & \tan^2\Psi - 1 & 0 & 0 \\ \tan^2\Psi - 1 & \tan^2\Psi + 1 & 0 & 0 \\ 0 & 0 & 2\tan\Psi \cos\Delta & 2\tan\Psi \sin\Delta \\ 0 & 0 & -2\tan\Psi \sin\Delta & 2\tan\Psi \cos\Delta \end{bmatrix} = \tag{39}$$

$$\frac{\sec^2\Psi}{2} \begin{bmatrix} 1 & -\cos 2\Psi & 0 & 0 \\ -\cos 2\Psi & 1 & 0 & 0 \\ 0 & 0 & \sin 2\Psi \cos\Delta & \sin 2\Psi \sin\Delta \\ 0 & 0 & -\sin 2\Psi \sin\Delta & \sin 2\Psi \cos\Delta \end{bmatrix},$$

where $\tan\Psi = r_p/r_s$ and $\Delta = \delta_p - \delta_s$ are the same as those previously defined in the Jones calculus.

The Mueller coordinates rotation matrix of $\theta_i$ (here the subscript i=1 or 2) is $$\Phi_{Mi}(\theta_i) = \begin{bmatrix} 1 & 0 & 0 & 0 \\ 0 & \cos 2\theta_i & \sin 2\theta_i & 0 \\ 0 & -\sin 2\theta_i & \cos 2\theta_i & 0 \\ 0 & 0 & 0 & 1 \end{bmatrix} \tag{40}$$

Denote the incident beam Stokes vector as $$S_{inc} = [S_0, S_1, S_2, S_3]^T \tag{41}$$

with the control of the polarization generator system and the polarization analyzer system, the Stokes vector of the output beam after the polarization analyzer system is $$S_{oq} = A_{Mq} M_s G_{Mq} S_{inc} \tag{42}$$

where $$M_s = \Phi_{M2} R_M \Phi_{M1} \tag{43}$$

which is the Mueller matrix of the sample including the coordinates rotation effect before and after reflection.

An analyzer vector $A_{Vq}$, which is a 1×4 row vector, could be formed by the detector vector D and the Mueller matrix of the polarization analyzer system $A_{Mq}$, $$A_{Vq} = D A_{Mq} = [a_{q,0}, a_{q,1}, a_{q,2}, a_{q,3}], \tag{44}$$

where the detector vector $D = [d_0, d_1, d_2, d_3]$. Note $D = [1, 0, 0, 0]$, if the detector is polarization insensitive. The output digital number ($DN_q$) of a pixel on the detector is $$DN_q = c A_{Vq} M_s P_{Vq}, \tag{45}$$

where $P_{Vq} = G_{Mq} S_{inc}$ is a 4×1 column vector. The parameter c is a constant proportionality factor. Similar to the previous Jones calculus analysis, in order to minimize instrumental polarization errors, it's more appropriate to set the proportionality factor to be dependent on the specific polarimetric setup, hence $c_q$ could be used, with the subscript "q" denoting the q-th polarimetric setup.

In element multiplication form, Eq. (45) could be rewritten as $$I_q = DN_q/c_q = \sum_{i,j=0}^{3} a_i m_{ij} p_j = \sum_{i,j=0}^{3} w_{ij} m_{ij} \quad (46)$$

where $w_{ij}=a_i p_j$, and $a_i$ is the i-th element of $A_{Vq}$, and $p_j$ is the j-th element of $P_{Vq}$. The irradiance parameter $I_q=DN_q/c_q$ is introduced for simplification of notation, and it's directly proportional to the irradiance recorded by the detector.

A polarimetric measurement vector (a 1×16 row vector) W' could be defined as $$W' = [w_{00}, w_{01}, w_{02}, w_{03}, w_{10}, w_{11}, w_{12}, w_{13}, \ldots, w_{32}, w_{33}] \quad (47)$$

and Eq. (46) could be rewritten as the product (a scalar) of a row vector and a column vector, by flattening the Mueller matrix of the sample $M_s$ into a 16×1 Mueller vector $$M = [m_{00}, m_{01}, m_{02}, m_{03}, m_{10}, m_{11}, m_{12}, m_{13}, \ldots, m_{32}, m_{33}]^T \quad (48)$$

A series of Q measurements could be taken to determine the Mueller matrix. For the q-th measurement, where q=0, 1, ... Q-1, the generator vector $P_{Vq}=[p_{q,0}, p_{q,1}, p_{q,2}, p_{q,3}]^T$ and the analyzer vector $A_{Vq}=[a_{q,0}, a_{q,1}, a_{q,2}, a_{q,3}]$ form the q-th polarimetric measurement vector $$W_q = [w_{q,00}, w_{q,01}, w_{q,02}, w_{q,03}, w_{q,10}, \ldots w_{q,33}] \quad (49)$$

where $w_{q,ij}=a_{q,i} p_{q,j}$, and the q-th output irradiance parameter $I_q$ of the detector is $$I_q = W_q M. \quad (50)$$

A polarimetric measurement matrix W, where $W_q$ is the q-th row, could be formed, and a set of irradiance parameters (calculated from measured digital numbers $I_q=DN_q/c_q$) could form an irradiance vector I, $$I = WM, \quad (51)$$

Or $$\begin{bmatrix} I_0 \\ I_1 \\ \vdots \\ I_{Q-1} \end{bmatrix} = \begin{bmatrix} w_{0,00} & w_{0,01} & \cdots & w_{0,33} \\ w_{1,00} & w_{1,01} & \cdots & w_{1,33} \\ \vdots & \vdots & \cdots & \vdots \\ w_{Q-1,00} & w_{Q-1,01} & \cdots & w_{Q-1,33} \end{bmatrix} \begin{bmatrix} m_{00} \\ m_{01} \\ \vdots \\ m_{33} \end{bmatrix} \quad (52)$$

The above mathematical description lays the foundation to retrieve thin film optical properties with disclosed Mueller matrix methods. To start, a simple case is first analyzed, where the geometric setup of a limited region could be chosen such that the rotational angles $\theta_1$ and $\theta_2$ are both small (for example, $-10°<\theta_1<10°$, $-10°<\theta_2<10°$. In this simplified case, the coordinates rotation matrices $\Phi_{M1}$ and $\Phi_{M2}$ in Eq. (43) could be further dropped. The resultant instrument polarization errors could be minimized by the calibration of the proportionality factor $c_q$ with a reference phantom. If an isotropic reference phantom is used, $M_{s0}=R_{M0}$ could be directly calculated by Eq. (39), since the parameters $\Psi$ and $\Delta$ are known for a reference phantom. By controlling the polarization generator system and the polarization analyzer system, the polarimetric measurement matrix W is directly known. Hence, the irradiance vector $I_0$ in Eq. (51) could be calculated for the reference phantom. With the digital numbers from measurements of Q different polarimetric setups with the reference phantom, the proportionality factor $c_q$ for each polarimetric setup could be calculated.

With the proportionality factors calculated from the reference phantom, and the measured digital numbers from the sample, the irradiance vector I of the sample could be calculated. Further, the polarimetric measurement matrix W is known, since it's directly controlled by the polarimetric setups. If W contains 16 linearly independent columns, all the 16 elements of the Mueller vector M and the Mueller matrix $M_s$ of the sample could be determined. If Q=16, the Mueller vector is $$M = W^{-1} I, \quad (53)$$

In general, Q>16, and M is overdetermined, and the pseudoinverse of W could be used to calculate the Mueller vector $$M = (W^T W)^{-1} W^T I = UI, \quad (54)$$

where $U=(W^T W)^{-1} W^T$ is the pseudoinverse of W, and generally referred to as the data reduction matrix. Rearrange the elements of the Mueller vector M, and the Mueller matrix $M_s$ of the sample is obtained.

For the cases when the coordinates rotation angles $\theta_1$ and $\theta_2$ are not negligible, three different reference phantoms of the same or substantially similar geometrical shape to the sample could be employed. Similar to Eq. (43), for the j-th reference phantoms $$M_{s0j} = \Phi_{M2} R_{M0j} \Phi_{M1} \quad (55)$$

could be used. Rearranging the Mueller matrix of the j-th reference phantom $M_{s0j}$ leads to a Mueller vector $M_{0j}$, and every element in $M_{0j}$ as in Eq. (51) could be a function of $\theta_1$ and $\theta_2$. Also, the Mueller matrix W is known from experimental setups. Hence, for the q-th polarimetric setup with three reference phantoms, $$I_{q01} = DN_{q01}/c_q = I_{q01}(\theta_1, \theta_2) \quad (56)$$

where the $\theta_1$ and $\theta_2$ dependence on the right-hand side of Eq. (56) is calculated from the element multiplication as in Eq. (50). Similarly, $$I_{q02} = DN_{q02}/c_q = I_{q02}(\theta_1, \theta_2) \quad (57)$$

$$I_{q03} = DN_{q03}/c_q = I_{q03}(\theta_1, \theta_2) \quad (58)$$

By taking ratios of two of the three equations in Eqs. (56-58), the proportionality factors $c_q$ could be cancelled, since $c_q$ is a constant for a specific pixel in a specific polarimetric and geometric setup, independent of the reference phantom type. Hence, angles $\theta_1$ and $\theta_2$ could be obtained by solving these two equations.

With $\theta_1$ and $\theta_2$ calibrated, all the proportionality factors $c_q$ could be directly calculated. Further, with the digital numbers from experimentally measured sample, the irradiance vector I of the sample and the polarimetric measurement matrix W are known. Therefore, the Mueller vector M of the sample could be calculated from Eq. (53) or Eq. (54), and the Mueller matrix $M_s$ is correspondingly obtained. Finally, from Eq. (43), $$R_M = \Phi_{M2}^{-1} M_s \Phi_{M1}^{-1}, \quad (59)$$

the Mueller matrix $R_M$ in the local p and s basis of the sample is obtained. If the sample is isotropic, ellipsometric angles $\Psi$ and $\Delta$ could be calculated based on Eq. (39), and further, the optical properties of the sample, such as thin film thickness or refractive index could be retrieved at all the points of the sample within the field of view.

If the optical surface of the sample has a depolarizing element behind it, mutual subtraction of digital numbers could be used. The two coordinates rotation angles $\theta_1$ and $\theta_2$ could be calculated with reference phantoms only, if four independent reference phantoms are used. For the q-th polarimetric setup with four reference phantoms, $$DN_{q0i} - DN_{q0j} = c_q [I_{q0i}(\theta_1, \theta_2) - I_{q0j}(\theta_1, \theta_2)] \quad (60)$$

where ($1 \leq i \leq 4$, $1 \leq j \leq 4$, $i \neq j$). Three independent equations in the form of Eq. (60) could be obtained, and taking ratios of these three equations to cancel $c_q$, two independent equations of ($\theta_1$, $\theta_2$) are obtained, and $\theta_1$ and $\theta_2$ could be calculated. Similarly, the Mueller vector M of the sample could be calculated from Eq. (53) or Eq. (54), and the Mueller matrices $M_s$ and $R_M$ are correspondingly obtained. Optical properties of the thin film could be further retrieved.

After the Mueller matrix of the sample is obtained, a polar decomposition could be employed to decompose the Mueller matrix into the product of a diattenuator, a retarder and a depolarizer, such as the classical form originally proposed by Lu and Chipman in "Interpretation of Mueller matrices based on polar decomposition". JOSA A. 1996 May 1; 13(5):1106-13, $$R_M = M_\Delta M_R M_D, \quad (61)$$

Note that the matrix multiplication is not commutative, and the three factors in the polar decomposition are order dependent. Other forms of polar decompositions in different orders could also be employed, but preferably, a certain polar decomposition order is chosen so that the interpretation is consistent for all samples.

Note that all the above analysis methods are valid for each spectral channel, and these spectral channels are treated independently. However, similar as the methods disclosed with Jones calculus, for ellipsometric systems that integrate multispectral or hyperspectral imaging, system geometric parameters are independent of variation of spectral channels. Therefore, the measurements from different spectral channels under a certain geometric setup could be directly compared, and the necessary measurements could be significantly reduced due to the shared geometric parameters, such as $\theta_1$ and $\theta_2$. Moreover, least-square best fit or maximum likelihood estimation could be used for the calculation of these shared geometric parameters from different spectral channels, if the unknown parameters are overdetermined.

Add spectral dependence to Eq. (43) and Eqs. (50-51), $$M_{s\lambda} = \Phi_{M2} R_{M\lambda} \Phi_{M1}, \quad (62)$$

$$I_{q\lambda} = W_{q\lambda} M_\lambda, \quad (63)$$

$$I_\lambda = W_\lambda M_\lambda, \quad (64)$$

The reflection Mueller matrix in the local p and s coordinate basis $R_{M\lambda}$, the q-th polarimetric measurement vector $W_{q\lambda}$ and the polarimetric measurement matrix $W_\lambda$ are all wavelength-dependent, but $W_{q\lambda}$ and $W_\lambda$ are both known. The coordinates rotation matrices $\Phi_{M1}$ and $\Phi_{M2}$ are independent of wavelength. Generally, for a reference phantom with known optical properties, each element of the wavelength dependent Mueller vector $M_{0\lambda}$ is dependent on $\theta_1$ and $\theta_2$. For a sample, the Mueller vector $M_\lambda$ is further dependent on the sixteen elements of the reflection Mueller matrix $R_{M\lambda}$.

Based on Eq. (46), if two spectral channels are analyzed together, $$I_{q\lambda 1} = DN_{q\lambda 1}/c_{q\lambda 1} = I_{q\lambda 1}(\theta_1, \theta_2, R_{M\lambda 1}), \quad (65)$$

$$I_{q\lambda 2} = DN_{q\lambda 2}/c_{q\lambda 2} = I_{q\lambda 2}(\theta_1, \theta_2, R_{M\lambda 2}), \quad (66)$$

Similar to the previous Jones calculus, the constant proportionality factors $c_{q\lambda 1}$ and $c_{q\lambda 2}$ are different, since different spectral response for the same object point could be different. Generally, $R_{M\lambda 1}$ and $R_{M\lambda 2}$ each has 16 unknown elements.

For a reference phantom, $$I_{q0\lambda 1} = DN_{q0\lambda 1}/c_{q\lambda 1} = I_{q0\lambda 1}(\theta_1, \theta_2), \quad (67)$$

$$I_{q0\lambda 2} = DN_{q0\lambda 2}/c_{q\lambda 2} = I_{q0\lambda 2}(\theta_1, \theta_2), \quad (68)$$

since the reflection Mueller matrices $R_{M0\lambda 1}$ and $R_{M0\lambda 2}$ are known for a reference phantom. The ratios of digital numbers of the sample and the reference phantom are $$R_{DNq\lambda 1} = \frac{DN_{q\lambda 1}}{DN_{q0\lambda 1}} = \frac{I_{q\lambda 1}(\theta_1, \theta_2, R_{M\lambda 1})}{I_{q0\lambda 1}(\theta_1, \theta_2)} \quad (69)$$

$$R_{DNq\lambda 2} = \frac{DN_{q\lambda 2}}{DN_{q0\lambda 2}} = \frac{I_{q\lambda 2}(\theta_1, \theta_2, R_{M\lambda 2})}{I_{q0\lambda 2}(\theta_1, \theta_2)} \quad (70)$$

If a sample is isotropic, the 16 unknown parameters in a reflection Mueller matrix $R_{M\lambda}$, are reduced to two unknowns $\Psi_\lambda$ and $\Delta_\lambda$, as shown in Eq. (39). $R_{M\lambda 1}$ has $\Psi_{\lambda 1}$, $\Delta_{\lambda 1}$ two unknowns, $R_{M\lambda 2}$ has $\Psi_{\lambda 2}$, $\Delta_{\lambda 2}$ two unknowns, and together with $\theta_1$ and $\theta_2$, there are six unknowns. Hence at least three polarimetric setup is necessary with a single-reference method, and each polarimetric setup corresponds to two equations of the forms of Eqs. (69-70). At least six equations are obtained, enough to retrieve these six unknowns.

If the sample is not isotropic, in general, there are 16 unknowns in $R_{M\lambda 1}$, and 16 unknowns in $R_{M\lambda 2}$, and together with $\theta_1$ and $\theta_2$, there are 34 unknowns. Hence, at least 17 polarimetric setups are necessary with a single-reference method, and each polarimetric setup corresponds to two equations of the forms of Eqs. (69-70). At least 34 equations are obtained, enough to retrieve these 34 unknowns.

More generally, if F (F$\geq$2) spectral channels are analyzed together for an isotropic sample, the unknowns are $\Psi_{\lambda 1}$, $\Psi_{\lambda 2}$, ..., $\Psi_{\lambda F}$, $\Delta_{\lambda 1}$, $\Delta_{\lambda 2}$, ..., $\Delta_{\lambda F}$, $\theta_1$ and $\theta_2$, in total, 2F+2 unknowns. At least three polarimetric setups are necessary with a single-reference method, and each setup correspond to F equations of $R_{DNq\lambda 1}$ to $R_{DNq\lambda F}$. At least 3F equations could be obtained, enough to retrieve 2F+2 unknowns. In this case, at least six measurements are necessary (three for the sample and three for the reference phantom).

Furthermore, if F (F$\geq$2) spectral channels are analyzed together for an anisotropic sample, there are 16F unknowns in $R_{M\lambda 1}$, $R_{M\lambda 2}$, ..., $R_{M\lambda F}$, and $\theta_1$ and $\theta_2$ two more unknowns, in total, 16F+2 unknowns. At least 17 polarimetric setups are necessary with a single-reference method, and each setup correspond to F equations of $R_{DNq\lambda 1}$ to $R_{DNq\lambda F}$. At least 17F equations could be obtained, enough to retrieve 16F+2 unknowns. In this case, at least 34 measurements are necessary (17 for the sample and 17 for the reference phantom).

If there is a depolarizing element behind the front optical surface with the thin film, mutual subtraction of the digital numbers could be employed, and the wavelength-dependent ratio of mutual subtraction of digital numbers is $$R_{DN,mn,\lambda} = \frac{DN_{m\lambda} - DN_{n\lambda}}{DN_{m0\lambda} - DN_{n0\lambda}}, \quad (71)$$
$$= \frac{I_{m\lambda}(\theta_1, \theta_2, R_{M\lambda}) - I_{n\lambda}(\theta_1, \theta_2, R_{M\lambda})}{I_{m0\lambda}(\theta_1, \theta_2) - I_{n0\lambda}(\theta_1, \theta_2)}$$
$$= E_{DN,mn,\lambda}(\theta_1, \theta_2, R_{M\lambda})$$

where subscripts "m" and "n" stand for the m-th and n-th polarimetric setup, respectively.

If two spectral channels are analyzed together for an isotropic sample surface with a depolarizing element behind, there are $\Psi_{\lambda 1}$, $\Delta_{\lambda 1}$, $\Psi_{\lambda 2}$, $\Delta_{\lambda 2}$, $\theta_1$ and $\theta_2$ six unknowns. Hence at least four polarimetric setups are necessary with a single-reference method to form at least three independent polarimetric setup pairs, and each independent polarimetric setup pair corresponds to two equations of $R_{DN,mn,\lambda 1}$ and $R_{DN,mn,\lambda 2}$ in the form of Eq. (71). At least six equations are obtained, enough to retrieve these six unknowns.

If the sample surface is not isotropic, in general, there are 16 unknowns in $R_{M\lambda 1}$, and 16 unknowns in $R_{M\lambda 2}$, and together with $\theta_1$ and $\theta_2$, there are 34 unknowns. Hence, at least 18 polarimetric setups, and 17 independent polarimetric setup pairs are necessary with a single-reference method. Each polarimetric setup corresponds to two equations of $R_{DN,mn,\lambda 1}$ and $R_{DN,mn,\lambda 2}$ in the form of Eq. (71). At least 34 equations are obtained, enough to retrieve these 34 unknowns.

More generally, if F (F≥2) spectral channels are analyzed together for an isotropic sample surface with a depolarizing element behind, the unknowns are $\Psi_{\lambda 1}, \Psi_{\lambda 2}, \ldots, \Psi_{\lambda F}, \Delta_{\lambda 1}, \Delta_{\lambda 2}, \ldots, \Delta_{\lambda F}$, $\theta_1$ and $\theta_2$, in total, 2F+2 unknowns. At least four polarimetric setups are necessary with a single-reference method to form at least three independent polarimetric setup pairs. Each independent polarimetric setup pair corresponds to F equations of $R_{DN,mn,\lambda 1}$ to $R_{DN,mn,\lambda F}$ in the form of Eq. (71). At least 3F equations could be obtained, enough to retrieve the 2F+2 unknowns. In this case, at least eight measurements are necessary (four for the sample and four for the reference phantom).

Furthermore, if F (F≥2) spectral channels are analyzed together for an anisotropic sample surface with a depolarizing element behind, there are 16F unknowns in $R_{M\lambda 1}$, $R_{M\lambda 2}, \ldots, R_{M\lambda F}$, and $\theta_1$ and $\theta_2$ two more unknowns, in total, 16F+2 unknowns. At least 18 polarimetric setups are necessary with a single-reference method to form at least 17 independent polarimetric setup pairs. Each independent polarimetric setup pair corresponds to F equations of $R_{DN,mn,\lambda 1}$ to $R_{DN,mn,\lambda F}$ in the form of Eq. (71). At least 17F equations could be obtained, enough to retrieve the 16F+2 unknowns. In this case, at least 36 measurements are necessary (18 for the sample and 18 for the reference phantom).

All publications, patents and patent applications referred to herein are incorporated by reference in their entirety to the same extent as if each individual publication, patent or patent application was specifically and individually indicated to be incorporated by reference in its entirety in the present application.

The invention has been described in detail with particular reference to certain preferred embodiments thereof, but it will be understood that variations and modifications can be effected within the spirit and scope of the invention.

The invention claimed is:

1. A thin film spectroellipsometric imaging device, comprising:

an illuminator to direct light from a light source through a polarization generator system toward an extended area of a sample, wherein said illuminator is broadband, covering visible and infrared spectra, wherein said polarization generator system generates a plurality of polarization states, wherein said sample is curved, wherein said curved sample has a geometrical shape, wherein said illuminator comprises a registration pattern panel, wherein said registration pattern panel is located between said light source and said sample;

an imaging system to form images of said extended area of said curved sample, wherein said imaging system comprises a polarization analyzer system, wherein said images comprise a registration pattern of said registration pattern panel reflected off said curved sample, wherein said registration pattern is defocused in said images;

a detection system to record said images, wherein said detection system comprises a plurality of spectral channels, covering visible and infrared spectra;

a computer to display and analyze said recorded images from said detection system; and at least one reference phantom with known optical properties to replace said curved sample for calibration, wherein said at least one reference phantom has the same or substantially similar geometrical shape as of said curved sample or a segment of said curved sample, wherein at least one image of said registration pattern of said reference phantom is used to calibrate at least one image of said registration pattern of said curved sample based on geometric transformation of reflected images of said registration pattern panel.

2. The device of claim 1, wherein said polarization generator system is a member selected from a group consisting of a linear polarizer, a circular polarizer, an elliptical polarizer, a rotating linear polarizer, a combination of a linear polarizer and a rotating retarder, and a combination of a linear polarizer and two variable retarders.

3. The device of claim 1, wherein said illuminator is positioned with an azimuthal angle and a polar angle which are adjustable.

4. The device of claim 1, wherein said illuminator comprises a beam shaping group to match said geometrical shape of said sample.

5. The device of claim 1, wherein said sample has a freeform shape that decomposes into measurable flat or curved segments.

6. The device of claim 1, wherein said curved sample has a thin film that dynamically evolves.

7. The device of claim 1, wherein said polarization analyzer system in said imaging system is a member selected from a group consisting of a linear analyzer, a circular analyzer, an elliptical analyzer, a rotating linear analyzer, a combination of a rotating retarder and a linear analyzer, a combination of two variable retarders and a linear analyzer, and a combination of a waveplate and a polarizing beamsplitter.

8. The device of claim 1, wherein said detection system comprises at least one spectral splitting optical element, wherein said at least one spectral splitting optical element is a member selected from a group consisting of at least one dichroic beamsplitter, at least one tunable filter, and at least one grating.

9. The device of claim 1, wherein said detection system comprises a spectrometer system.

10. The device of claim 9, wherein said spectrometer system comprises a member selected from a group consisting of a transmissive spectrometer, a reflective spectrometer, a catadioptric spectrometer and a Fourier transform spectrometer.

11. The device of claim 1, wherein said device comprises a snapshot spectrometer system.

12. The device of claim 1, wherein incident polarization state on said curved sample varies within said extended area.

13. The device of claim 1, wherein said registration pattern panel is integrated with said polarization generator system.

14. The device of claim 1, wherein said reference phantom is a bare isotropic substrate or an isotropic substrate with isotropic thin films deposited on.

15. A thin film spectroellipsometric imaging device, comprising:
- an illuminator to direct light from a light source through a polarization generator system toward an extended area of a sample, wherein said illuminator is broadband, covering visible and infrared spectra, wherein said polarization generator system generates a plurality of polarization states, wherein said sample is curved, wherein said curved sample has a geometrical shape, wherein said illuminator comprises a registration pattern panel, wherein said registration pattern panel is located between said light source and said sample;
- an imaging system to form images of said extended area of said curved sample, wherein said images comprise a registration pattern of said registration pattern panel reflected off said curved sample, wherein said registration pattern is defocused in said images;
- a detection system to record said images, wherein said detection system comprises a plurality of spectral channels, covering visible and infrared spectra, wherein said detection system comprises a polarization analyzer system;
- a computer to display and analyze said recorded images from said detection system; and
- at least one reference phantom with known optical properties to replace said curved sample for calibration, wherein said at least one reference phantom has the same or substantially similar geometrical shape as of said curved sample or a segment of said curved sample, wherein at least one image of said registration pattern of said reference phantom is used to calibrate at least one image of said registration pattern of said curved sample based on geometric transformation of reflected images of said registration pattern panel.

16. The device of claim 15, wherein said polarization analyzer system in said detection system comprises at least one polarization sensitive layer integrated in said detection system, wherein each of said at least one polarization sensitive layer comprises a plurality of analyzers.

17. A method performed by a thin film spectroellipsometric imaging device, comprising:
- directing light from an illuminator from a light source through a polarization generator system toward an extended area of a curved sample having a geometrical shape, wherein said illuminator is broadband, covering visible and infrared spectra, wherein said polarization generator system generates a plurality of polarization states, wherein said illuminator comprises a registration pattern panel, wherein said registration pattern panel is located between said light source and said sample;
- forming images of said extended area of said curved sample with an imaging system, wherein said images are formed on a detection system, wherein said imaging system or said detection system comprises a polarization analyzer system, wherein said images comprise a registration pattern of said registration pattern panel reflected off said curved sample, wherein said registration pattern is defocused in said images;
- adjusting said polarization generator system and said polarization analyzer system to obtain a series of polarimetric setups;
- recording said images of said curved sample in said series of polarimetric setups with said detection system, wherein said detection system measures in a plurality of spectral channels, covering visible and infrared spectra;
- replacing said curved sample with at least one reference phantom with known optical properties to record images of said at least one reference phantom, wherein said at least one reference phantom has the same or substantially similar geometrical shape as of said curved sample or a segment of said curved sample; and
- analyzing said recorded images of said curved sample and said at least one reference phantom with a computer, wherein at least one image of said registration pattern of said reference phantom is used to calibrate at least one image of said registration pattern of said curved sample based on geometric transformation of reflected images of said registration pattern panel.

18. The method of claim 17, further comprising:
- transforming said images of said at least one reference phantom to match said images of said curved sample, based on images of a registration pattern panel.

19. The method of claim 17, wherein said images are recorded as digital numbers, wherein said analyzing comprises:
- compensating said digital numbers with flat-field correction;
- taking ratios of said digital numbers or mutual subtraction of said digital numbers from said curved sample and said at least one reference phantom under the same polarimetric setups;
- forming an equation set of unknown optical parameters in said series of polarimetric setups;
- determining said unknown optical parameters by solving said equation set.

20. The method of claim 17, wherein said images are recorded as digital numbers, wherein said analyzing comprises:
- selecting a search range for unknown optical parameters of said curved sample;
- creating a lookup table of ratios of digital numbers or mutual subtraction of digital numbers of said curved sample and said at least one reference phantom for all possible combinations of said unknown optical parameters in said search range;
- comparing experimentally measured ratios of said digital numbers or mutual subtraction of said digital numbers of said curved sample and said at least one reference phantom with said lookup table, and
- selecting a set of optical parameters that generates the least discrepancy in said ratios of said digital numbers or mutual subtraction of said digital numbers to determine said unknown optical parameters.

* * * * *